United States Patent
Hagimoto et al.

(10) Patent No.: US 10,487,712 B2
(45) Date of Patent: Nov. 26, 2019

(54) EXHAUST GAS CONTROL SYSTEM FOR INTERNAL COMBUSTION ENGINE AND CONTROL METHOD FOR EXHAUST GAS CONTROL SYSTEM

(71) Applicant: TOYOTA JIDOSHA KABUSHIKI KAISHA, Toyota-shi, Aichi-ken (JP)

(72) Inventors: Yuriko Hagimoto, Susono (JP); Yuji Miyoshi, Susono (JP); Hiromasa Nishioka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 49 days.

(21) Appl. No.: 15/711,232

(22) Filed: Sep. 21, 2017

(65) Prior Publication Data

US 2019/0010847 A1   Jan. 10, 2019

(30) Foreign Application Priority Data

Sep. 30, 2016  (JP) .................. 2016-194222

(51) Int. Cl.
  *F01N 3/20* (2006.01)
  *F01N 3/36* (2006.01)
  (Continued)

(52) U.S. Cl.
  CPC ........... *F01N 3/206* (2013.01); *F01N 3/0814* (2013.01); *F01N 3/0871* (2013.01); *F01N 3/108* (2013.01);
  (Continued)

(58) Field of Classification Search
  CPC ............. F01N 2430/06; F01N 2610/02; F01N 2610/03; F01N 3/0814; F01N 3/0871;
  (Continued)

(56) References Cited

U.S. PATENT DOCUMENTS 6,182,443 B1 *   2/2001   Jarvis .................... F01N 3/0814
                                                               60/274
6,832,473 B2 *  12/2004   Kupe .................... F01N 3/0231
                                                               60/274
(Continued)

FOREIGN PATENT DOCUMENTS

CN        102089506 A        6/2011
JP        2008-286001       11/2008
(Continued)

OTHER PUBLICATIONS

U.S. Appl. No. 15/709,775, filed Sep. 20, 2017.
(Continued)

*Primary Examiner* — Phutthiwat Wongwian
*Assistant Examiner* — Diem T Tran
(74) *Attorney, Agent, or Firm* — Finnegan, Henderson, Farabow, Garrett & Dunner, LLP

(57) ABSTRACT

An exhaust gas control system includes a NSR catalyst, a fuel supply valve, a SCR catalyst an addition device, and an electronic control unit. When temperature of NSR catalyst is in a range of a predetermined first temperature range and temperature of SCR catalyst is in a range of a predetermined second temperature range, the electronic control unit is configured to add additive with the addition device, and execute predetermined air-fuel ratio processing to control the air-fuel ratio of exhaust gas flowing into the NSR catalyst. In the predetermined air-fuel ratio processing, the electronic control unit is configured to execute a second air-fuel ratio processing after a first air-fuel ratio processing, and execute the third air-fuel ratio processing after a first air-fuel ratio processing and the second air-fuel ratio processing and in succession to the second air-fuel ratio processing.

8 Claims, 12 Drawing Sheets

(51) Int. Cl.
*F01N 3/08* (2006.01)
*F01N 3/10* (2006.01)

(52) U.S. Cl.
CPC ............... *F01N 3/208* (2013.01); *F01N 3/36* (2013.01); *F01N 2430/06* (2013.01); *F01N 2610/02* (2013.01); *F01N 2610/03* (2013.01); *Y02T 10/24* (2013.01)

(58) Field of Classification Search
CPC .......... F01N 3/108; F01N 3/206; F01N 3/208; F01N 3/36; Y02T 10/24
See application file for complete search history.

(56) References Cited

U.S. PATENT DOCUMENTS

| | | | | |
|---|---|---|---|---|
| 7,332,135 | B2* | 2/2008 | Gandhi | F01N 3/0814 60/286 |
| 7,584,605 | B2* | 9/2009 | Beckmann | F01N 3/0871 60/274 |
| 9,856,809 | B2* | 1/2018 | Nogi | F01N 3/0814 |
| 2006/0010857 | A1* | 1/2006 | Hu | F01N 3/0814 60/286 |
| 2008/0028829 | A1 | 2/2008 | Sawada et al. | |
| 2010/0089039 | A1 | 4/2010 | Asanuma et al. | |
| 2011/0138783 | A1 | 6/2011 | Sakurai | |
| 2012/0324868 | A1* | 12/2012 | Kim | F01N 3/2013 60/274 |
| 2016/0177798 | A1 | 6/2016 | Bisaiji et al. | |
| 2016/0230628 | A1 | 8/2016 | Hokuto | |
| 2017/0037757 | A1 | 2/2017 | Tanaka | |
| 2017/0167352 | A1 | 6/2017 | Hagiwara et al. | |
| 2017/0363029 | A1 | 12/2017 | Boerensen et al. | |

FOREIGN PATENT DOCUMENTS

| | | |
|---|---|---|
| JP | 2009-41442 | 2/2009 |
| JP | 2015-34504 | 2/2015 |

OTHER PUBLICATIONS

Office Action issued in U.S. Appl. No. 15/709,775 dated May 16, 2019.

Notice of Allowance issued in U.S. Appl. No. 15/709,775 dated Jul. 3, 2019.

* cited by examiner

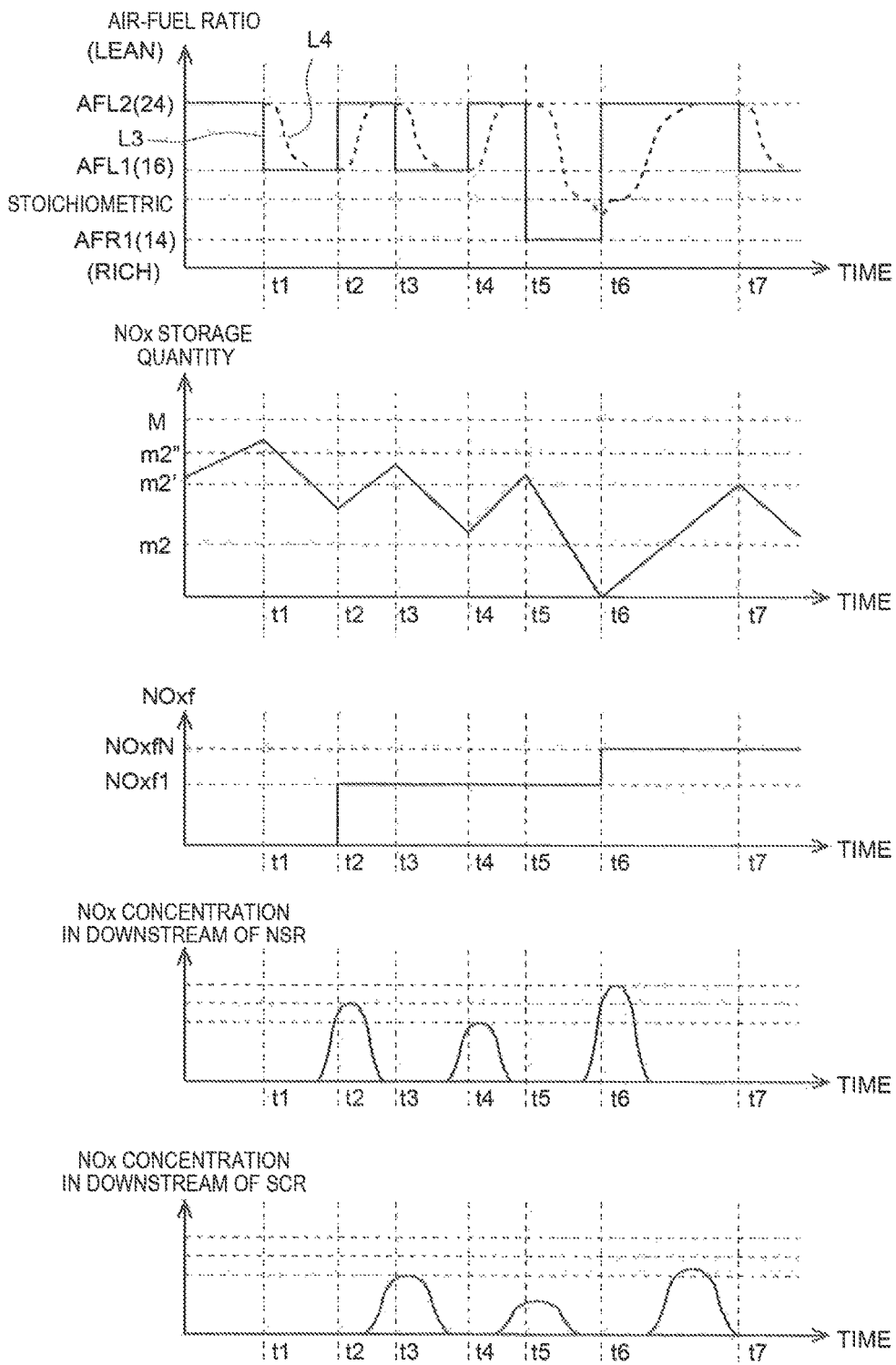

EXHAUST GAS CONTROL SYSTEM FOR INTERNAL COMBUSTION ENGINE AND CONTROL METHOD FOR EXHAUST GAS CONTROL SYSTEM

INCORPORATION BY REFERENCE

The disclosure of Japanese Patent Application No. 2016-194222 filed on Sep. 30, 2016 including the specification, drawings and abstract is incorporated herein by reference in its entirety.

BACKGROUND

1. Technical Field

The present disclosure relates to an exhaust gas control system for an internal combustion engine and a control method for the exhaust gas control system.

2. Description of Related Art

An exhaust passage of an internal combustion engine including an NOx storage reduction (NSR) catalyst and an selective catalytic reduction (SCR) catalyst may be adopted, the NSR catalyst and the SCR catalyst being disposed on an upstream side and a downstream side of the exhaust passage, respectively. In such an exhaust gas configuration, the NSR catalyst stores NOx in the exhaust gas when an air-fuel ratio of exhaust gas is a lean air-fuel ratio. When the air-fuel ratio of the exhaust gas flowing into the NSR catalyst is temporarily adjusted to be a rich air-fuel ratio, the stored NOx is emitted from the NSR catalyst and is reduced by a reaction with a reducing agent in the exhaust gas. In the SCR catalyst, NOx in the exhaust gas is selectively reduced when ammonia is supplied as a reducing agent as the exhaust gas flows into the SCR catalyst.

In an exhaust gas configuration of an internal combustion engine disclosed in Japanese Patent Application Publication No. 2008-286001, an exhaust passage is equipped with an NSR catalyst and an SCR catalyst disposed in order from the upstream side. In order to emit and reduce NOx stored in the NSR catalyst, fuel is supplied into the exhaust gas. During fuel supply to the exhaust gas, the NOx flowing out from the NSR catalyst to the downstream side is reduced in the SCR catalyst. A supply quantity of ammonia required for reduction of NOx in the SCR catalyst is determined in consideration of the quantity of NOx stored in the NSR catalyst as well as a conversion phenomenon of NOx to ammonia during NOx emission. Accordingly, excessive addition of ammonia to the SCR catalyst is avoided.

SUMMARY

When an exhaust gas control system is constructed to reduce NOx using the reducing performance of both the NSR catalyst and the SCR catalyst which are disposed in order from the upstream side in the exhaust passage of the internal combustion engine, it is necessary for efficient NOx reduction in the SCR catalyst to adjust the air-fuel ratio of the exhaust gas flowing into the SCR catalyst to be a lean air-fuel ratio at which oxygen is contained to some extent. This is considered to be because the valence of a reducing metal element (for example, copper Cu or the like) carried on a base material due to ion exchange in the SCR catalyst needs to be a valence required for a reduction reaction with oxygen. Accordingly, in the NSR catalyst on the upstream side, when the exhaust gas flowing into the NSR catalyst to emit and reduce stored NOx is adjusted to be a predetermined rich air-fuel ratio, an air-fuel ratio atmosphere not suitable for the reduction reaction of NOx may be formed in the SCR catalyst positioned on the downstream side. As a result, it may be difficult to continuously reduce the NOx flowing out from the upstream side in the SCR catalyst.

Accordingly, the present disclosure provides an exhaust gas control system for an internal combustion engine and a control method for the exhaust gas control system having an NSR catalyst and an SCR catalyst disposed in order from the upstream side in an exhaust passage of the internal combustion engine to achieve adequate use of both the catalysts to enhance NOx reducing performance as a system.

An exhaust gas control system for an internal combustion engine and a control method for the internal combustion engine in the present disclosure includes the configuration in which before air-fuel ratio processing for adjusting an air-fuel ratio of exhaust gas flowing into the NSR catalyst to be a predetermined rich air-fuel ratio so as to reduce stored NOx, air-fuel ratio processing for emitting NOx stored in the NOx catalyst and air-fuel ratio processing for recovering NOx reducing performance of the SCR catalyst are performed. Accordingly, at the time of reducing stored NOx in the NSR catalyst, an NOx storage quantity in the NSR catalyst is decreased, and an NOx reducing performance of the SCR catalyst is recovered. Accordingly, the NOx flowing out to the downstream side at the time of reduction treatment can be treated with the NOx reducing performance of the SCR catalyst. In the present disclosure, storage of NOx by the NSR catalyst includes the form of a so-called adsorption of NOx.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7B is a second diagram illustrating transition of parameters relating to NOx reduction when the air-fuel ratio processing using both the catalysts illustrated in FIGS. 6A and 6B is executed;

DETAILED DESCRIPTION OF EMBODIMENTS

Figure 1:
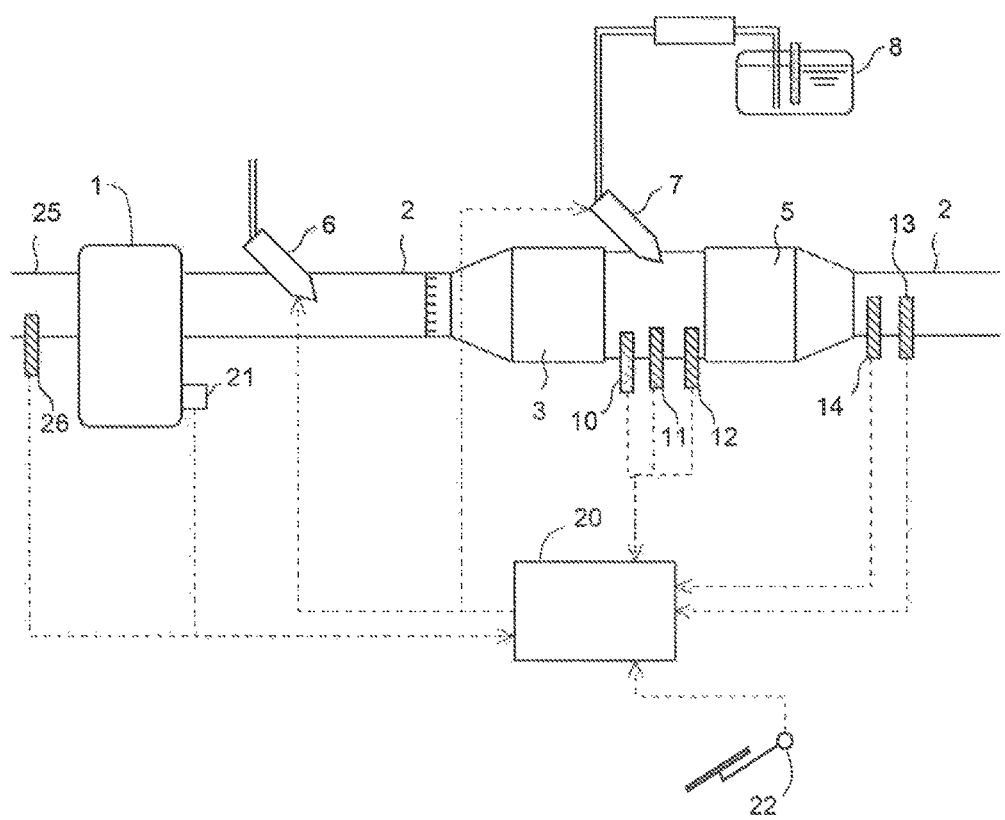
FIG. 1 illustrates a schematic configuration of an exhaust gas control system for an internal combustion engine according to the present disclosure.

A first aspect of the present disclosure relates to an exhaust gas control system for an internal combustion engine. The exhaust gas control system includes an NOx storage reduction catalyst, a fuel supply valve, a selective catalytic reduction catalyst, an addition device, and an electronic control unit. The NOx storage reduction catalyst is provided in an exhaust passage of the internal combustion engine. The fuel supply valve is configured to supply fuel to exhaust gas flowing into the NOx storage reduction catalyst so as to adjust an air-fuel ratio of the exhaust gas flowing into the NOx storage reduction catalyst. The selective catalytic reduction catalyst is provided on the downstream side of the NOx storage reduction catalyst in the exhaust passage. The selective catalytic reduction catalyst is configured to selectively reduce NOx with ammonia as a reducing agent. The addition device is configured to add one of ammonia and a precursor of ammonia as an additive to the exhaust gas flowing into the selective catalytic reduction catalyst. The electronic control unit is configured to control the exhaust gas control system. When the electronic control unit determines that temperature of the NOx storage reduction catalyst is temperature within a predetermined first temperature range and temperature of the selective catalytic reduction catalyst is temperature within a predetermined second temperature range, the electronic control unit is configured to add the additive with the addition device, and execute predetermined air-fuel ratio processing that controls the air-fuel ratio of the exhaust gas flowing into the NOx storage reduction catalyst with the fuel supply valve. The predetermined first temperature rage is a temperature range in which the NOx storage reduction catalyst is capable of reducing NOx. The predetermined second temperature range is a temperature range in which the selective catalytic reduction catalyst is capable of reducing NOx. The predetermined air-fuel ratio processing includes first air-fuel ratio processing, second air-fuel ratio processing, and third air-fuel ratio processing. The first air-fuel ratio processing is processing in which the electronic control unit executes fuel supply with the fuel supply valve so as to adjust the air-fuel ratio of the exhaust gas flowing into the NOx storage reduction catalyst to be a first lean air-fuel ratio. The first lean air-fuel ratio is leaner than the stoichiometric air-fuel ratio. The first lean air-fuel ratio causes emission of stored NOx from the NOx storage reduction catalyst. The second air-fuel ratio processing is processing in which the electronic control unit regulates fuel supply with the fuel supply valve so as to adjust the air-fuel ratio of the exhaust gas flowing into the NOx storage reduction catalyst to be a second lean air-fuel ratio. The second lean air-fuel ratio is an air-fuel ratio leaner than the first lean air-fuel ratio. The third air-fuel ratio processing is processing in which the electronic control unit executes fuel supply with the fuel supply valve so as to reduce NOx stored in the NOx storage reduction catalyst and adjust the air-fuel ratio of the exhaust gas flowing into the NOx storage reduction catalyst to be a predetermined rich air-fuel ratio. The predetermined rich air-fuel ratio is an air-fuel ratio richer than the stoichiometric air-fuel ratio. In the predetermined air-fuel ratio processing, the electronic control unit is configured to execute the second air-fuel ratio processing after the first air-fuel ratio processing, and execute the third air-fuel ratio processing after the first air-fuel ratio processing and the second air-fuel ratio processing and in succession to the second air-fuel ratio processing.

In the exhaust gas control system for an internal combustion engine according to the present disclosure, an NOx storage reduction catalyst (NSR catalyst) and a selective catalytic reduction catalyst (SCR catalyst) are disposed in order from the upstream side in an exhaust passage. The NSR catalyst stores NOx in lean atmosphere. In NOx reduction by the NSR catalyst, the fuel supplied with the fuel supply valve is used as a reducing agent. More specifically, when fuel is supplied with the fuel supply valve to adjust the air-fuel ratio of the exhaust gas to be a predetermined rich air-fuel ratio, and the exhaust gas having the predetermined rich air-fuel ratio flows into the NSR catalyst, NOx stored in the NSR catalyst is reduced with the fuel as a reducing agent. In the SCR catalyst, with use of an additive added by the addition device, NOx reduction is performed with ammonia as a reducing agent.

Here, in the exhaust gas control system of the present disclosure, the temperature of the NSR catalyst and the SCR catalyst varies in accordance with the operating state of the internal combustion engine. When the temperature of the NSR catalyst belongs to a predetermined first temperature range, while the temperature of the SCR catalyst belongs to the predetermined second temperature range in particular, NOx in exhaust gas can be reduced using both the NOx reducing performance of the NSR catalyst and the NOx reducing performance of the SCR catalyst. However, when the air-fuel ratio of the exhaust gas flowing into the NSR catalyst is simply adjusted to be the predetermined rich air-fuel ratio at the time of reducing NOx stored in the NSR catalyst, the air-fuel ratio of the exhaust gas surrounding the SCR catalyst positioned on the downstream side of the NSR catalyst becomes inadequate for reduction of NOx. As a result, it was difficult to sufficiently enhance the NOx reducing performance of the exhaust gas control system. Accordingly, when the NOx reducing performance of both the SCR catalyst and the NSR catalyst is available as in the present disclosure, the NOx storage quantity in the NSR catalyst is decreased before reduction treatment of the NOx stored in the NSR catalyst so as to reduce the quantity of NOx flowing out to the downstream side at the time of the reduction treatment. Then, the additive is added with the addition device, so that the reduction treatment can be performed in the state where the NOx reducing performance of the SCR catalyst is recovered by the effect of oxygen included in the exhaust gas having the lean air-fuel ratio. The electronic control unit further executes predetermined air-fuel ratio processing including first air-fuel ratio processing, second air-fuel ratio processing, and third air-fuel ratio processing through fuel supply with the fuel supply valve.

The first air-fuel ratio processing is processing configured to adjust the air-fuel ratio of exhaust gas flowing into the NSR catalyst to be a first lean air-fuel ratio. The first lean air-fuel ratio is an air-fuel ratio leaner than the stoichiometric air fuel ratio. The first lean air-fuel ratio can cause emission of stored NOx in the NSR catalyst. Accordingly, when the first air-fuel ratio processing is performed, the stored NOx is emitted from the NSR catalyst at an emission speed (NOx emissions per unit time) controlled to be relatively low. The NOx storage quantity naturally decreases with emission of the stored NOx. Most of the emitted NOx is not reduced by the NSR catalyst but flows out to the downstream side. Here, while the first air-fuel ratio processing is performed, the air-fuel ratio of the exhaust gas flowing into the SCR catalyst also becomes a lean air-fuel ratio attributed to the first lean air-fuel ratio. Accordingly, NOx is also reducible in the SCR catalyst. However, since fuel supply is performed with the fuel supply valve in order to form the first lean air-fuel ratio, it is hard to smoothly recover an ion valence of a reducing metal element in the SCR catalyst as compared with the case where fuel supply is not performed. Under the circumstances, the NOx reducing performance of the SCR catalyst may deteriorate as the first air-fuel ratio processing continues.

Accordingly, in the predetermined air-fuel ratio processing, the second air-fuel ratio processing is executed after the first air-fuel ratio processing is performed. The second air-fuel ratio processing is processing where the air-fuel ratio of the exhaust gas flowing into the NSR catalyst is adjusted to be a second lean air-fuel ratio that is leaner than the first lean air-fuel ratio. As a result, the speed of NOx emission from the NSR catalyst decreases or the NOx emission substantially stops. At the same time, the exhaust gas containing more oxygen is fed to the SCR catalyst. This makes it possible to achieve effective recovery of the ion valence of the reducing metal element in the SCR catalyst. In the second air-fuel ratio processing, fuel supply with the fuel supply valve may be stopped so as to adjust the air-fuel ratio of the exhaust gas flowing into the NSR catalyst to be the second lean air-fuel ratio. In this case, since the air-fuel ratio of the exhaust gas is adjusted be an air-fuel ratio as lean as possible, recovery of the ion valence of the reducing metal element in the SCR catalyst is achieved more swiftly. Since the second air-fuel ratio processing recovers the ion valence of the reducing metal element in the SCR catalyst in this way, the state enabling the SCR catalyst to reduce NOx is formed even in the case where the first air-fuel ratio processing is performed again after the second air-fuel ratio processing, or the third air-fuel ratio processing is performed in succession to the second air-fuel ratio processing as described later.

In the exhaust gas control system, the electronic control unit may be configured to execute the first air-fuel ratio processing and the second air-fuel ratio processing one time respectively, and then execute the third air-fuel ratio processing in succession to the second air-fuel ratio processing in the predetermined air-fuel ratio processing. The electronic control unit may be configured to repeatedly execute the first air-fuel ratio processing and the second air-fuel ratio processing in an alternate manner in the predetermined air-fuel ratio processing. The electronic control unit may be configured to execute the third air-fuel ratio processing in succession to the second air-fuel ratio processing executed lastly, when the electronic control unit executes the first air-fuel ratio processing and the second air-fuel ratio processing repeatedly in the alternate manner. In either case, the third air-fuel ratio processing is executed after the first air-fuel ratio processing and the second air-fuel ratio processing and in succession to the second air-fuel ratio processing. The third air-fuel ratio processing causes the air-fuel ratio of the exhaust gas flowing into the NSR catalyst to be the predetermined rich air-fuel ratio so as to achieve reduction treatment of the stored NOx by the NSR catalyst.

Here, as described in the foregoing, in the predetermined air fuel ratio processing, the first air-fuel ratio processing is executed one time or a plurality of times before the third air-fuel ratio processing is performed, and the second air-fuel ratio processing is performed immediately before the third air-fuel ratio processing. Therefore, at the time when the third air-fuel ratio processing is started, the NOx storage quantity in the NSR catalyst is decreased from the quantity at the time when the predetermined air-fuel ratio processing is started by the electronic control unit. When the exhaust gas having the predetermined rich air-fuel ratio flows into the NSR catalyst for reduction of the stored NOx in the NSR catalyst, the emission speed of NOx is temporarily increased, which causes the emitted NOx to easily flow out to the downstream side. The speed of emitted NOx tends to become higher as the NOx storage quantity in the NSR catalyst is larger. Accordingly, decreasing the NOx storage quantity in the first air-fuel ratio processing before execution of the third air-fuel ratio processing contributes to suppressing the NOx outflow to the downstream side at the time of the third air-fuel ratio processing. During the first air-fuel ratio processing, NOx is also reducible on the SCR catalyst side as described before. Since the second air-fuel ratio processing is performed immediately before the third air-fuel ratio processing, the NOx reducing performance of the SCR catalyst is also sufficiently recovered at the time when the third air-fuel ratio processing is started. Therefore, the NOx flowing out to the downstream side during the third air-fuel ratio processing is reducible in the SCR catalyst even when the exhaust gas flowing into the NSR catalyst has the predetermined rich air-fuel ratio. As a result, the electronic control unit implements the NOx reduction treatment sufficient of the exhaust gas control system.

In order to reduce the flowing-out NOx in the SCR catalyst during the third air-fuel ratio processing and to thereby suppress the outflow of NOx from the selective catalytic reduction catalyst as much as possible, the NOx storage quantity in the NSR catalyst may be decreased to a predetermined quantity by executing the first air-fuel ratio processing one time or a plurality of times before the third air-fuel ratio processing, so that the speed of NOx emission from the NSR catalyst during the third air-fuel ratio processing is within the range low enough to be covered by the reducing performance of the SCR catalyst recovered by the second air-fuel ratio processing.

In the exhaust gas control system according to the present disclosure, the temperature of the NSR catalyst is in the rage of the predetermined first temperature range, but the temperature of the SCR catalyst is not in the range of the predetermined second temperature range, NOx reduction treatment in the NSR catalyst may be performed using only the fuel supply with the fuel supply valve. Specifically, the fuel supply adjusts the air-fuel ratio of the exhaust gas flowing into the NSR catalyst to be the rich air-fuel ratio suitable for reduction of the stored NOx. In the case where the temperature of the SCR catalyst is in the rage of the predetermined second temperature range but the temperature of the NSR catalyst is not in the rage of the predetermined first temperature range, NOx reduction treatment may be performed not by fuel supply with the fuel supply valve but by addition of an additive by the adding device.

As described in the foregoing, according to the exhaust gas control system for an internal combustion engine of the present disclosure, it becomes possible to adequately use the NSR catalyst and the SCR catalyst to enhance the NOx reducing performance as a system.

In the exhaust gas control system, when the electronic control unit determines that the temperature of the NOx storage reduction catalyst is the temperature within the predetermined first temperature range, and the temperature of the selective catalytic reduction catalyst is the temperature within a temperature range lower than a threshold temperature in the predetermined second temperature range, the electronic control unit may be configured to add the additive with the addition device and execute the predetermined air-fuel ratio processing with the fuel supply valve. When the electronic control unit determines that the temperature of the NOx storage reduction catalyst is the temperature within the predetermined first temperature range, and the temperature of the selective catalytic reduction catalyst is the temperature within a temperature range equal to or more than the threshold temperature in the predetermined second temperature range, the electronic control unit may be configured to add the additive with the addition device and execute high-temperature air-fuel ratio processing relating to the air-fuel ratio of the exhaust gas flowing into the NOx storage reduction catalyst with the fuel supply valve. The high-temperature air-fuel ratio processing may be different from the predetermined air-fuel ratio processing. The high-temperature air-fuel ratio processing may include fourth air-fuel ratio processing and fifth air-fuel ratio processing. The fourth air-fuel ratio processing may be processing in which the electronic control unit executes fuel supply with the fuel supply valve so as to adjust the air-fuel ratio of the exhaust gas flowing into the NOx storage reduction catalyst to be a fourth lean air-fuel ratio. The fourth lean air-fuel ratio may be leaner than the stoichiometric air-fuel ratio. The fourth lean air-fuel ratio may cause emission of stored NOx from the NOx storage reduction catalyst. The fifth air-fuel ratio processing may be processing in which the electronic control unit regulates fuel supply with the fuel supply valve so as to adjust the air-fuel ratio of the exhaust gas flowing into the NOx storage reduction catalyst to be a fifth lean air-fuel ratio. The fifth lean air-fuel ratio may be leaner than the fourth lean air-fuel ratio. The electronic control unit may be configured to repeatedly execute the fourth air-fuel ratio processing and the fifth air-fuel ratio processing in an alternate manner in the high-temperature air-fuel ratio processing.

That is, the above configuration is for dividing the air-fuel ratio processing, which is performed in unison with addition of the additive by the addition device, into the predetermined air-fuel ratio processing and the high-temperature air-fuel ratio processing when NOx reduction treatment is performed by the electronic control unit. The division is carried out in accordance with the temperature of the SCR catalyst. Specifically, when the temperature of the SCR catalyst is lower than the threshold temperature in the second temperature range, the predetermined air-fuel ratio processing is performed. When the temperature of the SCR catalyst is the threshold temperature or more, the high-temperature air-fuel ratio processing is performed. This is because when the temperature of the SCR catalyst is equal to or more than the threshold temperature in the predetermined second temperature range, the NOx reducing performance of the SCR catalyst tends to increase more than when the temperature of the SCR catalyst is lower than the threshold temperature.

When the electronic control unit performs NOx reduction treatment, i.e., when NOx reduction is performed using both the NSR catalyst, and the SCR catalyst, while the reducing performance of the SCR catalyst is in the state of being relatively high as described above, it is better to perform SCR catalyst-based NOx reduction that is achieved not by adjusting the air-fuel ratio of the exhaust gas flowing into the NSR catalyst to be the predetermined rich air-fuel ratio but by addition of an additive to the exhaust gas than NSR catalyst-based NOx reduction that is achieved by adjusting the air-fuel ratio of exhaust gas flowing into the NSR catalyst to be the predetermined rich air-fuel ratio as in the predetermined air-fuel ratio processing. This is because NOx reduction by the SCR catalyst is selective NOx reduction with ammonia as a reducing agent. Since the selective NOx reduction is relatively high in NOx reduction efficiency, the NOx reducing performance of the exhaust gas control system can easily be enhanced. Furthermore, when the SCR catalyst-based NOx reduction is performed, fuel supply to the exhaust gas becomes unnecessary, so that discharge of fuel components to the outside of the system can be suppressed. Accordingly, when the temperature of the SCR catalyst is equal to or more than the threshold temperature, the high-temperature air-fuel ratio processing is employed as the air-fuel ratio processing for the NOx reduction using both the NSR catalyst and the SCR catalyst.

In the high-temperature air-fuel ratio processing, the electronic control unit repeatedly executes the fourth air-fuel ratio processing and the fifth air-fuel ratio processing in an alternate manner so as to lower the speed of NOx emission from the NSR catalyst as much as possible and to avoid deterioration in the NOx reducing performance of the SCR catalyst caused when the air-fuel ratio of the exhaust gas flowing into the SCR catalyst becomes rich at the time of the NOx emission.

Here, the fourth air-fuel ratio processing is processing the air-fuel ratio of exhaust gas flowing into the NSR catalyst is adjusted to be the fourth lean air-fuel ratio. The fourth lean air-fuel ratio is leaner than the stoichiometric air-fuel ratio. The fourth lean air-fuel ratio can cause emission of stored NOx in the NSR catalyst. The fourth lean air-fuel ratio may be identical to or different from the air-fuel ratio of the first lean air-fuel ratio. When the fourth air-fuel ratio processing is performed, the stored NOx is emitted from the NSR catalyst, but the emission speed is controlled to be relatively low as in the first air-fuel ratio processing. Most of the emitted NOx is not reduced by the NOx catalyst but flows out to the downstream side. Here, while the fourth air-fuel ratio processing is performed, the air-fuel ratio of the exhaust gas flowing into the SCR catalyst also becomes a lean air-fuel ratio attributed to the fourth lean air-fuel ratio. Accordingly, NOx is also reducible in the SCR catalyst. However, since fuel supply is performed with the fuel supply valve in order to form the fourth lean air-fuel ratio, it is hard to smoothly recover an ion valence of a reducing metal element in the SCR catalyst as compared with the case where fuel supply is not performed, tinder such circumstances, the NOx reducing performance of the SCR catalyst may deteriorate as the fourth air-fuel ratio processing continues.

Accordingly, in the high-temperature air-fuel ratio processing, the fifth air-fuel ratio processing is executed after the fourth air-fuel ratio processing is performed. The fifth air-fuel ratio processing causes the air-fuel ratio of the exhaust gas flowing into the NSR catalyst to be a fifth lean air-fuel ratio that is leaner than the fourth lean air-fuel ratio. The fifth lean air-fuel ratio may be identical to or different from the second lean air-fuel ratio. The fifth air-fuel ratio processing decreases the speed of NOx emission from the NSR catalyst or substantially stops the NOx emission. At the same time, the exhaust gas containing more oxygen is fed to the SCR catalyst. This makes it possible to achieve effective recovery of the ion valence of the reducing metal element in the SCR catalyst.

In the high-temperature air-fuel ratio processing, the fourth air-fuel ratio processing and the fifth air-fuel ratio processing are alternately repeated. More specifically, emission of the stored NOx is mainly performed in the NSR catalyst due to the fourth air-fuel ratio processing. After the emission of the stored NOx, the emitted NOx is reduced in the SCR catalyst. Then, the fifth air-fuel ratio processing is performed in succession to the fourth air-fuel ratio processing such that the ion valence of the reducing metal element in the SCR catalyst is in the state suitable for NOx reduction. At this time, NOx reduction by the SCR catalyst is also efficiently performed. In such repetition of the fourth air-fuel ratio processing and the fifth air-fuel ratio processing, NOx reduction is performed mainly by the SCR catalyst.

As described in the foregoing, when the electronic control unit performs NOx reduction, the predetermined air-fuel ratio processing and the high-temperature air-fuel ratio processing are executed in accordance with the temperature of the SCR catalyst, so that adequate NOx reduction treatment is executed in accordance with the temperatures of the NSR catalyst and the SCR catalyst, respectively. As a result, both the catalysts are adequately used to enhance the NOx reducing performance as a system.

In the aforementioned exhaust gas control system, when fuel supply is stopped in the second air-fuel ratio processing so as to adjust the air-fuel ratio of the exhaust gas flowing into the NSR catalyst to be the second lean air-fuel ratio, the exhaust gas containing a relatively large quantity of oxygen flows into the SCR catalyst. In such a case, recovery of the ion valence of the reducing metal element in the SCR catalyst in the second air-fuel ratio processing may be implemented relatively swiftly. Accordingly, the electronic control unit may be configured to stop fuel supply with the fuel supply valve in the second air-fuel ratio processing so as to adjust the air-fuel ratio of the exhaust gas flowing into the NOx storage reduction catalyst to be the second lean air-fuel ratio. When the electronic control unit determines that the air-fuel ratio of the exhaust gas flowing out of the NOx storage reduction catalyst becomes one of the second lean air-fuel ratio and an air-fuel ratio in the vicinity of the second lean air-fuel ratio in the second air-fuel ratio processing, the electronic control unit may be configured to stop the second air-fuel ratio processing. Once the second air-fuel ratio processing is started and the air-fuel ratio of the exhaust gas flowing out of the NSR catalyst becomes the second lean air-fuel ratio or the air-fuel ratio in the vicinity of the second lean air-fuel ratio (air-fuel ratio such as the second air-fuel ratio) in this way, it is considered that a required quantity of oxygen is soon supplied to the SCR catalyst positioned on the downstream side. Accordingly, the timing when the air-fuel ratio of the exhaust gas flowing out of the NSR catalyst becomes the air-fuel ratio such as the second lean air-fuel ratio after the second air-fuel ratio processing is started can be adopted as rational timing of stopping the second air-fuel ratio processing and switching to the next processing.

In the aforementioned exhaust gas control system, the electronic control unit may be configured to stop fuel supply with the fuel supply valve in the fifth air-fuel ratio processing so as to adjust the air-fuel ratio of the exhaust gas flowing into the NOx storage reduction catalyst to be the fifth lean air-fuel ratio. In this case, since the air-fuel ratio of the exhaust gas is adjusted to be an air-fuel ratio as lean as possible, recovery of the ion valence of the reducing metal element in the SCR catalyst is achieved more swiftly.

In the aforementioned exhaust gas control system, in the predetermined air-fuel ratio processing, when the electronic control unit determines that the NOx reducing rate by the selective catalytic reduction catalyst becomes less than a predetermined reducing rate threshold value during the first air-fuel ratio processing, the electronic control unit may be configured to switch the first air-fuel ratio processing to the second air-fuel ratio processing, and then continue the second air-fuel ratio processing for a predetermined period. As described in the foregoing. When the first air-fuel ratio processing is performed in the predetermined air-fuel ratio processing, the ion valence of the reducing metal element in the SCR catalyst on the downstream side may change to the state unsuitable for NOx reduction with the lapse of time. As a result, the NOx reducing rate of the SCR catalyst deteriorates. Accordingly, when the NOx reducing rate becomes less than the predetermined reducing rate threshold value, it can be rationally determined that the ion valence of the reducing metal element in the SCR catalyst should be recovered at that timing. At the timing of the NOx reducing rate becoming less than the predetermined reducing rate threshold value, the first air-fuel ratio processing is switched to the second air-fuel ratio processing. As a consequence, the ion valence of the reducing metal element in the SCR catalyst is recovered. When the second air-fuel ratio processing is performed, the exhaust gas containing a larger quantity of oxygen is fed to the SCR catalyst. Accordingly, the second air-fuel ratio processing continues for a predetermined period that is the period required to recover the ion valence of the reducing metal element in the SCR catalyst; and then, the processing is stopped. When the second air-fuel ratio processing is stopped, the first air-fuel ratio processing may be performed again, or the third air-fuel ratio processing may be performed in succession.

A second aspect of the present disclosure relates to a control method for an exhaust gas control system. The exhaust gas control system is provided with an internal combustion engine. The exhaust gas control system includes an NOx storage reduction catalyst, a fuel supply valve, a selective catalytic reduction catalyst, an addition device, and an electronic control unit. The NOx storage reduction catalyst is provided in an exhaust passage of the internal combustion engine. The fuel supply valve is configured to supply fuel to exhaust gas flowing into the NOx storage reduction catalyst so as to regulate an air-fuel ratio of the exhaust gas flowing into the NOx storage reduction catalyst. The selective catalytic reduction catalyst is provided on the downstream side of the NOx storage reduction catalyst in the exhaust passage. The selective catalytic reduction catalyst is configured to selectively reduce NOx with ammonia as a reducing agent. The addition device is configured to add one of ammonia and a precursor of ammonia as an additive to the exhaust gas flowing into the selective catalytic reduction catalyst. The control method includes: when the electronic control unit determines that temperature of the NOx storage reduction catalyst is temperature within a predetermined first temperature range and temperature of the selective catalytic reduction catalyst is temperature within a predetermined second temperature range, adding, by the electronic control unit, the additive with the addition device, and executing, by the electronic control unit, predetermined air-fuel ratio processing that controls the air-fuel ratio of the exhaust gas flowing into the NOx storage reduction catalyst with the fuel supply valve; and in the predetermined air-fuel ratio processing, executing, by the electronic control unit, the second air-fuel ratio processing after the first air-fuel ratio processing, and executing, by the electronic control unit, the third air-fuel ratio processing after the first air-fuel ratio processing and the second air-fuel ratio processing and in succession to the second air-fuel ratio processing. The predetermined first temperature range is a temperature range in which the NOx storage reduction catalyst is capable of reducing NOx. The predetermined second temperature range is a temperature range in which the selective catalytic reduction catalyst is capable of reducing NOx. The predetermined air-fuel ratio processing includes first air-fuel ratio processing, second air-fuel ratio processing, and third air-fuel ratio processing. The first air-fuel ratio processing is processing in which the electronic control unit executes fuel supply with the fuel supply valve so as to adjust the air-fuel ratio of the exhaust gas flowing into the NOx storage reduction catalyst to be a first lean air-fuel ratio. The first lean air-fuel ratio is leaner than the stoichiometric air-fuel ratio. The first lean air-fuel ratio causes emission of stored NOx from the NOx storage reduction catalyst. The second air-fuel ratio processing is processing in which the electronic control unit regulates fuel supply with the fuel supply valve so as to adjust the air-fuel ratio of the exhaust gas flowing into the NOx storage reduction catalyst to be a second lean air-fuel ratio. The second lean air-fuel ratio is an air-fuel ratio leaner than the first lean air-fuel ratio. The third air-fuel ratio processing is processing in which the electronic control unit executes fuel supply with the fuel supply valve so as to reduce NOx stored in the NOx storage reduction catalyst and adjust the air-fuel ratio of the exhaust gas flowing into the NOx storage reduction catalyst to be a predetermined rich air-fuel ratio. The predetermined rich air-fuel ratio is an air-fuel ratio richer than the stoichiometric air-fuel ratio. With this configuration, the effects same as the first aspect is obtained.

According to the present disclosure, in an exhaust gas control system having an NSR catalyst and an SCR catalyst disposed in order from the upstream side in an exhaust passage of an internal combustion engine, adequate use of both the catalysts can be achieved to enhance the NOx reducing performance as a system.

Specific modes of implementing the present disclosure will be described hereinbelow with reference to the accompanying drawings. Note that sizes, materials, shapes, relative arrangements, and the like of component members disclosed in embodiments are not intended to restrict the disclosed technical scope thereto unless otherwise specified.

FIG. 1 illustrates a schematic configuration of an exhaust gas control system for an internal combustion engine 1 according to the present embodiment. The internal combustion engine 1 is a diesel engine for driving a vehicle.

The internal combustion engine 1 is connected to an exhaust passage 2. The exhaust passage 2 is equipped with a selective catalytic reduction catalyst (SCR catalyst) configured to selectively reduce NOx catalyst in exhaust gas with ammonia as a reducing agent. The SCR catalyst 5 is configured such that copper Cu that is a reducing metal element is ion-exchanged and thereby carried on zeolite used as a base material. In order to generate ammonia that acts as a reducing agent in the SCR catalyst 5, urea water that is a precursor of ammonia stored in a urea tank 8 is added to exhaust gas, as one example of the additive according to the present disclosure, by an addition valve 7 positioned on the upstream side of the SCR catalyst 5. The urea water added from the addition valve 7 is hydrolyzed with the heat of the exhaust gas to generate ammonia, and the generated ammonia is adsorbed onto the SCR catalyst 5. The ammonia causes a reduction reaction with NOx in the exhaust gas, which results in purification of NOx. The addition of urea water by the addition valve 7 is one example of the processing by the addition device according to the present disclosure. Although the urea water is added from the addition valve 7 in the present embodiment as described in the foregoing, ammonia or aqueous ammonia may directly be added to the exhaust gas instead.

Provided on the downstream side of the SCR catalyst 5 is an oxidation catalyst (hereinafter referred to as "ASC catalyst") for oxidizing ammonia that slips through the SCR catalyst 5. In FIG. 1, the ASC catalyst is omitted. The ASC catalyst may be a catalyst configured from a combination of an oxidation catalyst and an SCR catalyst that reduces NOx in exhaust gas with ammonia as a reducing agent. In this case, for example, the oxidation catalyst may be formed from a noble metal such as platinum Pt that is carried on a carrier made of a material such as aluminum oxide $Al_2O_3$ and zeolite. The SCR catalyst may be formed from a material, such as copper Cu and iron Fe, that is carried on a carrier made of zeolite. When the ASC catalyst is formed as a catalyst having such configuration, HC, CO, and ammonia in exhaust gas can be oxidized. Furthermore, ammonia can partially be oxidized to generate NOx, and the generated NOx can also be reduced with excessive ammonia.

The exhaust passage 2 is further equipped with an NOx storage reduction catalyst (NSR catalyst) 3 provided on the upstream side of the SCR catalyst 5 and the addition valve 7. The NSR catalyst 3 has an storage agent that stores NOx. When exhaust gas inflow has a high oxygen concentration, the NSR catalyst 3 stores NOx in the exhaust gas. When the exhaust gas inflow has a low oxygen concentration and a reducing agent such as fuel for the internal combustion engine 1 is present, the NSR catalyst 3 emits and reduces the stored NOx. In the present embodiment, the reducing agent used in the NSR catalyst 3 is the fuel for the internal combustion engine 1 supplied by a fuel supply valve 6 provided on the upstream side of the NSR catalyst 3. The fuel supplied by the fuel supply valve 6 flows into the NSR catalyst 3 together with the exhaust gas, and acts as a reducing agent therein. The fuel supply with the fuel supply valve 6 regulates the air-fuel ratio of the exhaust gas flowing into the NSR catalyst 3. Although the fuel supply is performed with the fuel supply valve 6 in the present embodiment, adjustment of fuel injection conditions (such as fuel injection quantity and fuel injection timing) in the internal combustion engine 1 may be performed instead in order to regulate the fuel included in the exhaust gas discharged from the internal combustion engine 1.

Provided on the downstream side of the NSR catalyst 3 and on the upstream side of the SCR catalyst 5 are an air-fuel ratio sensor 10 that detects the air-fuel ratio of the exhaust gas flowing out of the NSR catalyst 3, an NOx sensor 11 that detects NOx concentration in the exhaust gas, and a temperature sensor 12 that detects temperature of the exhaust gas. Provided on the downstream side of the SCR catalyst 5 are an NOx sensor 13 that detects NOx concentration in the exhaust gas flowing out of the SCR catalyst 5, and a temperature sensor 14 that detects temperature of the exhaust gas. The exhaust gas control system for the internal combustion engine 1 is annexed with an electronic control unit (ECU) 20. The ECU 20 is a unit that controls an operating state of the internal combustion engine 1, the exhaust gas control system, and the like. The ECU 20 is electrically connected to the air fuel ratio sensor 10, the NOx sensors 11, 13, and the temperature sensors 12, 14 described before. The ECU 20 is also electrically connected to other sensors such as a crank position sensor 21, an accelerator opening sensor 22 and an air flowmeter 26 installed in an intake passage 25 of the internal combustion engine 1. Detection values of the sensors are delivered to the ECU 20. Therefore, the ECU 20 can grasp parameters relating to the operating state of the internal combustion engine 1, such as an intake air quantity based on the detection value of the air flowmeter 26, an exhaust gas flow rate calculated based on the intake air quantity, an engine speed based on the detection value of the crank position sensor 21, and engine load based on the detection value of the accelerator opening sensor 22. The ECU 20 can estimate catalyst temperature of the NSR catalyst 3 based on the detection value of the temperature sensor 12, and can also estimate the temperature of the SCR catalyst 5 based on the detection value of the temperature sensor 14.

The NOx concentration in the exhaust gas flowing into the NSR catalyst 3 corresponds to the NOx concentration of the exhaust gas discharged from the internal combustion engine 1. Accordingly, in the present embodiment, the ECU 20 can estimate the NOx concentration in the exhaust gas flowing into the NSR catalyst 3 based on the operating state of the internal combustion engine 1. Furthermore, since the exhaust gas flows into the NSR catalyst 3, and NOx in the exhaust gas is stored in the NSR catalyst 3, the ECU 20 can estimate the quantity of NOx (NOx storage quantity) stored in the NSR catalyst 3 based on the NOx concentration in the exhaust gas flowing into the NSR catalyst 3 and on the exhaust gas flow rate. The exhaust gas flow rate is calculated based on parameters such as the intake flow rate detected with the air flowmeter 26 and the fuel injection quantity in the internal combustion engine 1.

As for the SCR catalyst 5, the ECU 20 gives an instruction to the addition valve 7 in accordance with the NOx concentration (i.e., the detection value of the NOx sensor 11) in the exhaust gas flowing into the SCR catalyst 5 so as to supply to the exhaust gas the quantity of the urea water required for reduction and purification of NOx. For example, based on the estimated quantity of ammonia adsorbed onto the SCR catalyst 5, urea water addition from the addition valve 7 may be determined. A detailed description of the estimation of the ammonia adsorption quantity in the SCR catalyst 5 is omitted in this specification. Alternatively, addition of urea water from the addition valve 7 may be controlled such that the NOx reducing rate of the SCR catalyst 5 determined by the following expression 1 falls within a predetermined range preferable from a viewpoint of exhaust gas purification. Further alternatively, addition of urea water from the addition valve 7 may be controlled based on a difference between the detection values of the NOx sensors 11, 13 disposed on the upstream side and the downstream side of the SCR catalyst 5, respectively.

NOx reducing rate=1−(detection value of NOx sensor 13)/(detection value of NOx sensor 11)    (Expression 1)

Figure 2A:
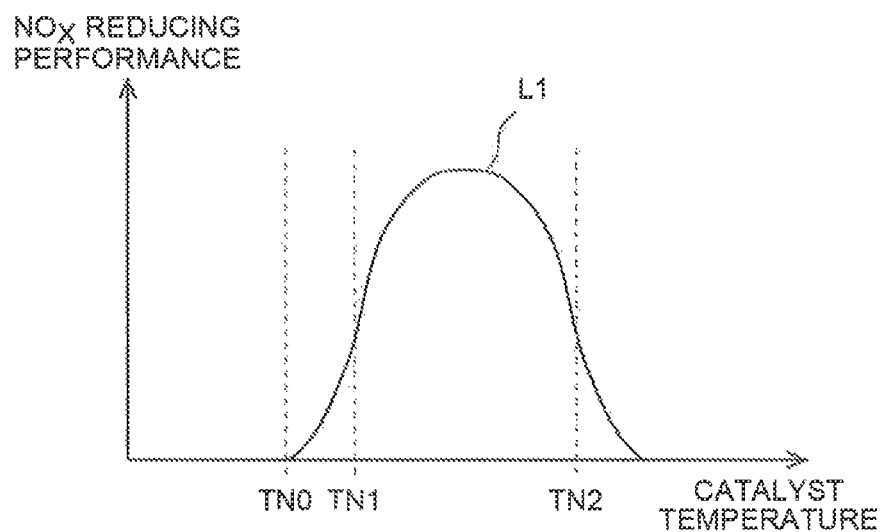
FIG. 2A illustrates correlation between catalyst temperature and NOx reducing performance in an NSR catalyst provided in the exhaust gas control system for an internal combustion engine illustrated in FIG. 1.
Figure 2B:
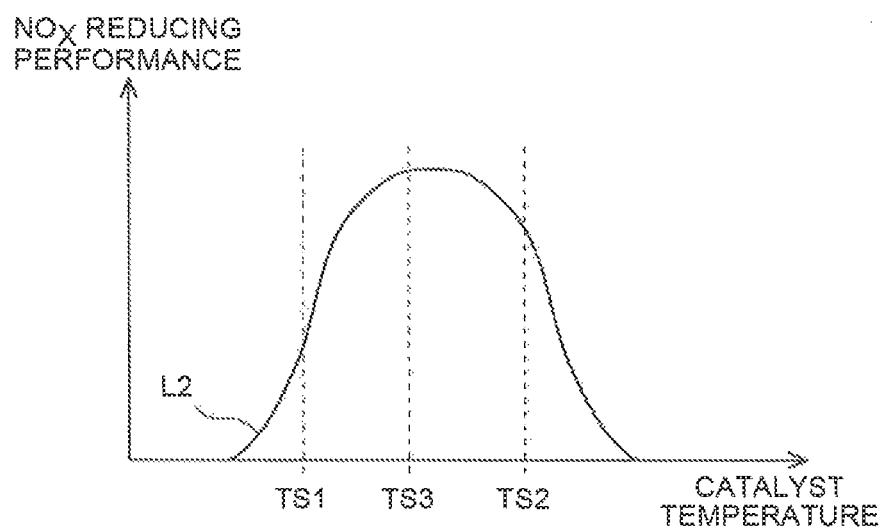
FIG. 2B illustrates correlation between catalyst temperature and NOx reducing performance in the SCR catalyst provided in the exhaust gas control system for an internal combustion engine illustrated in FIG. 1.

Here, a description is given of the NOx reducing performance of each of the NSR catalyst 3 and the SCR catalyst 5 included in the exhaust gas control system of the internal combustion engine 1 illustrated in FIG. 1 with reference to FIGS. 2A and 2B. The NOx reducing performance of the NSR catalyst 3 represents a sum total of the reduction quantity of the stored NOx per unit time and the quantity of NOx stored by the NSR catalyst 3 per unit time, the NOx reducing performance being demonstrated when a necessary and sufficient quantity of reducing agent (fuel) is supplied. Therefore, the NOx reducing performance of the NSR catalyst 3 can be demonstrated even when the catalyst temperature is in a temperature range where the stored NOx is not reducible. The NOx reducing performance of the SCR catalyst 5 represents a selective reduction quantity of NOx per unit time, the NOx reducing performance being demonstrated when a necessary and sufficient quantity of reducing agent (ammonia) is supplied. Therefore, the NOx reducing performance of the SCR catalyst 5 can be identified as the NOx reducing performance of the SCR catalyst 5.

Here, FIG. 2A illustrates correlation between the catalyst temperature and the NOx reducing performance of the NSR catalyst 3 with a line L1. FIG. 2B illustrates correlation between the catalyst temperature and the NOx reducing performance of the SCR catalyst 5 with a line L2. In the NSR catalyst 3, when the catalyst temperature belongs to the range of TN1 to TN2 (TN2>TN1), reduction of the stored NOx can be achieved with the fuel supplied from the fuel supply valve 6 as a reducing agent, so that the NOx reducing performance of the NSR catalyst 3 may adequately be demonstrated. Therefore, the temperature range (temperature ranges from TN1 to TN2) is one example of the predetermined first temperature range according to the present disclosure. In the case where the temperature of the NSR catalyst 3 is lower than TN1 and is equal to or more than TN0 (TN0<TN1), it is difficult for the NSR catalyst 3 to reduce NOx. However, since NOx in the exhaust gas is stored in the NSR catalyst 3, the NOx reducing performance is demonstrated to some extent as a result.

In the SCR catalyst 5, when the catalyst temperature belongs to the range of TS1 to TS2 (TS2>TS1), reduction of NOx can be achieved with ammonia generated from urea water added from the addition valve 7 as a reducing agent, so that the NOx reducing performance of the SCR catalyst 5 may adequately be demonstrated. Therefore, the temperature range (temperature ranges from TS1 to TS2) is one example of the predetermined second temperature range according to the present disclosure. A temperature TS3 included in the predetermined second temperature range is one example of the threshold temperature according to the present disclosure. When the temperature of the SCR catalyst 5 belongs to a region equal to or more than the temperature TS3 that is the threshold temperature in the predetermined second temperature range, the NOx reducing performance (NOx reducing performance) of the SCR catalyst 5 is demonstrated more adequately than the case where the temperature of the SCR catalyst 5 belongs to a region lower than the temperature TS3.

The respective catalysts are designed such that the NOx reducing performance by the SCR catalyst 5 as an individual element is demonstrated at lower temperatures than the NOx reducing performance by the NSR catalyst 3 as an individual element. This is because a consideration is given to the fact that in the exhaust gas control system, the SCR catalyst 5 is disposed downstream from the NSR catalyst 3, and therefore the temperature of the SCR catalyst 5 tends to be lower than the temperature of the NSR catalyst 3 at the same timing. Since the SCR catalyst 5 is designed to be able to demonstrate the NOx reducing performance while the catalyst temperature is relatively low, the NOx reducing performance of the exhaust gas control system can be enhanced.

In the exhaust gas control system, fuel supply from the fuel supply valve 6 and urea water addition from the addition valve 7 are performed such that NOx reduction by the respective NSR catalyst 3 and the SCR catalyst 5 is performed in accordance with the catalyst temperature of the respective catalysts. For example, when NOx reduction is performed only by the NSR catalyst 3 since the catalyst temperature of the NSR catalyst 3 belongs to the predetermined first temperature range, but the temperature of the SCR catalyst 5 does not belong to the predetermined second temperature range, or when NOx reduction is performed only by the SCR catalyst 5 since the catalyst temperature of the NSR catalyst 3 does not belong to the predetermined first temperature range, hut the temperature of the SCR catalyst 5 belongs to the predetermined second temperature range, NOx reduction is performed by only one of the catalysts.

Figure 3:
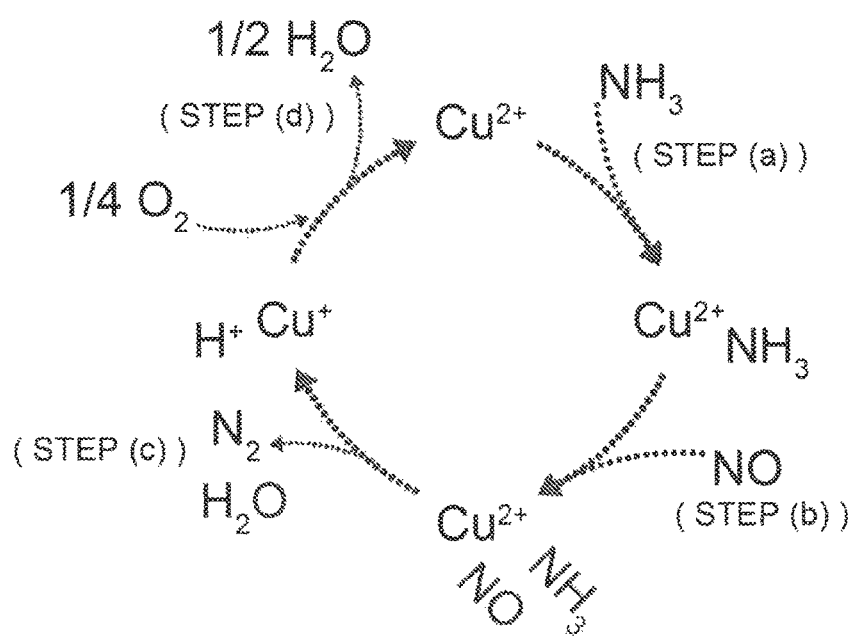
FIG. 3 is a model diagram for illustrating an NOx reduction reaction in the SCR catalyst.

When the catalyst temperature of the NSR catalyst 3 belongs to the predetermined first temperature range and the catalyst temperature of the SCR catalyst 5 belongs to the predetermined second SCR temperature range, NOx reduction can be performed by both the catalysts. Here, the NOx reduction reaction in the SCR catalyst 5 is described with reference to FIG. 3. FIG. 3 schematically illustrates the NOx reduction reaction for the description thereof. The NOx reduction reaction in the SCR catalyst 5 occurs on reducing metal element Cu carried in zeolite. The NOx reduction reaction is considered to be schematically divided into four steps (a) to (d). First, in step (a), ammonia ($NH_3$) is adsorbed onto a copper ion having a valence of 2+. In step (b), NOx (NO) is further adsorbed onto the copper ion. As a result, in step (c), a reduction reaction of NO takes place so that nitrogen ($N_2$) and water ($H_2O$) are generated, while the valence of the copper ion changes to 1+. At this time, hydrogen ion $H^+$ is adsorbed onto the copper ion $Cu^+$. When oxygen ($¼O_2$) is supplied to the copper ion Cu+ in this state in step (d), water ($½H_2O$) is generated, while the valence of the copper ion is recovered to 2+. Accordingly, the reaction from step (a) can sequentially be continued again, so that continuous NOx reduction by the SCR catalyst 5 can be achieved. Thus, in the SCR catalyst 5, in order to implement continuous NOx reduction, it is considered that the valence of the copper ion needs to be recovered ($Cu^+ \rightarrow Cu^{2+}$) in step (d). However, if it is attempted to reduce stored NOx with the NSR catalyst 3 by adjusting the air-fuel ratio of the exhaust gas flowing into the NSR catalyst 3 to be a rich air-fuel ratio in the case of using both the catalysts for NOx reduction, NOx ends up flowing out to the downstream side, and the SCR catalyst 5 is exposed to stoichiometric or rich atmosphere. As a result, insufficient oxygen supply is performed in step (d), which hinders valence recovery ($Cu^+ \rightarrow Cu^{2+}$) of the copper ion as a reducing metal element in the SCR catalyst 5. This makes it difficult for the SCR catalyst 5 to implement continuous NOx reduction. Accordingly, in the case of using both the catalysts, it is necessary to form the NOx reducing performance of the entire exhaust gas control system with due consideration to catalytic characteristics of the NSR catalyst 3 and the SCR catalyst 5.

Figure 4:
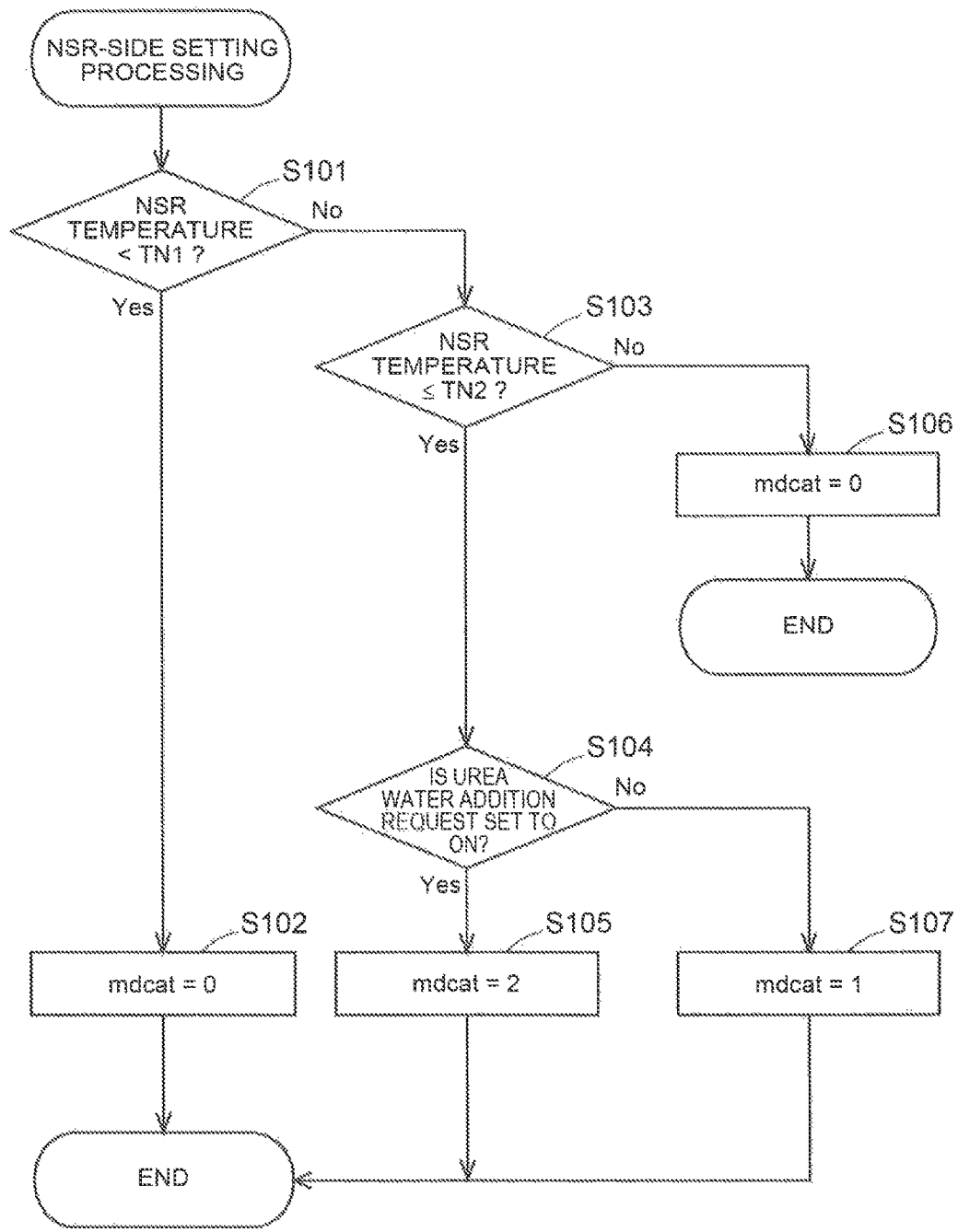
FIG. 4 is a flowchart of first NSR-side setting processing for determining ratio processing performed in the exhaust gas control system for an internal combustion engine illustrated in FIG. 1.
Figure 5:
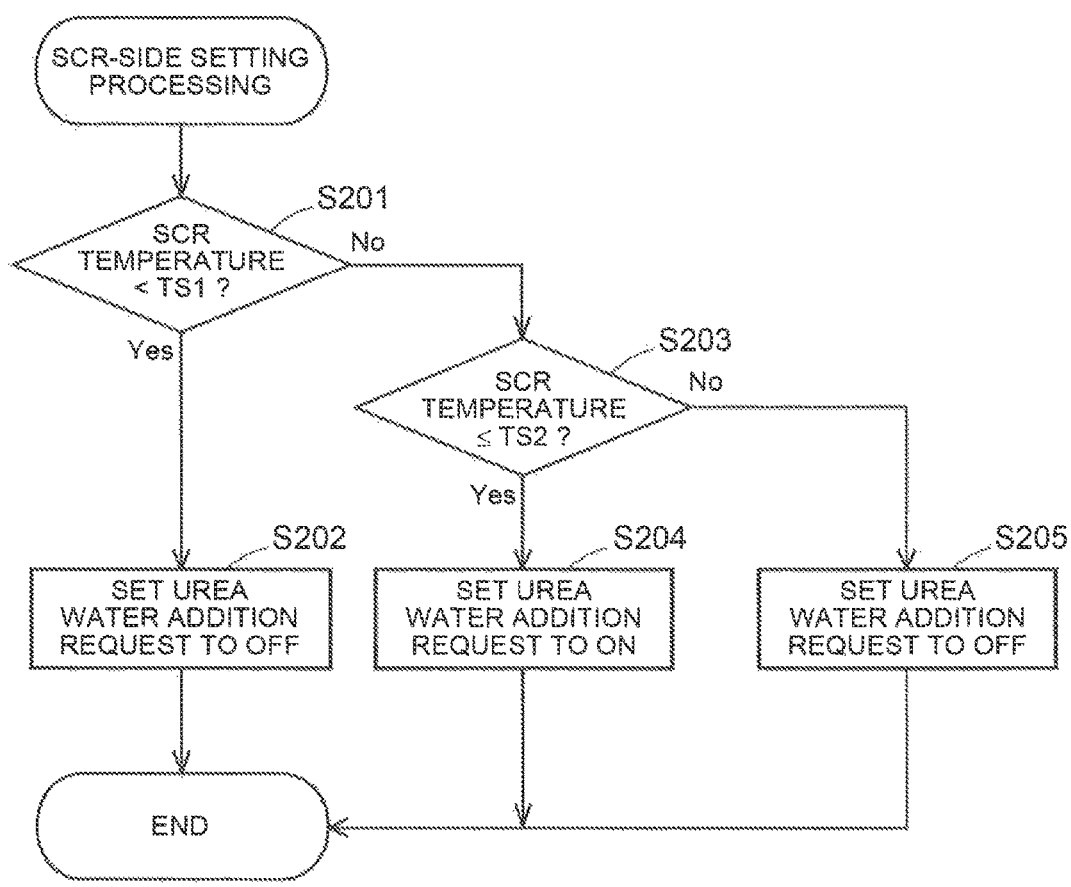
FIG. 5 is a flowchart of SCR-side setting processing for determining ammonia supply to the SCR catalyst provided in the exhaust gas control system for an internal combustion engine illustrated in FIG. 1.
Figure 6A:
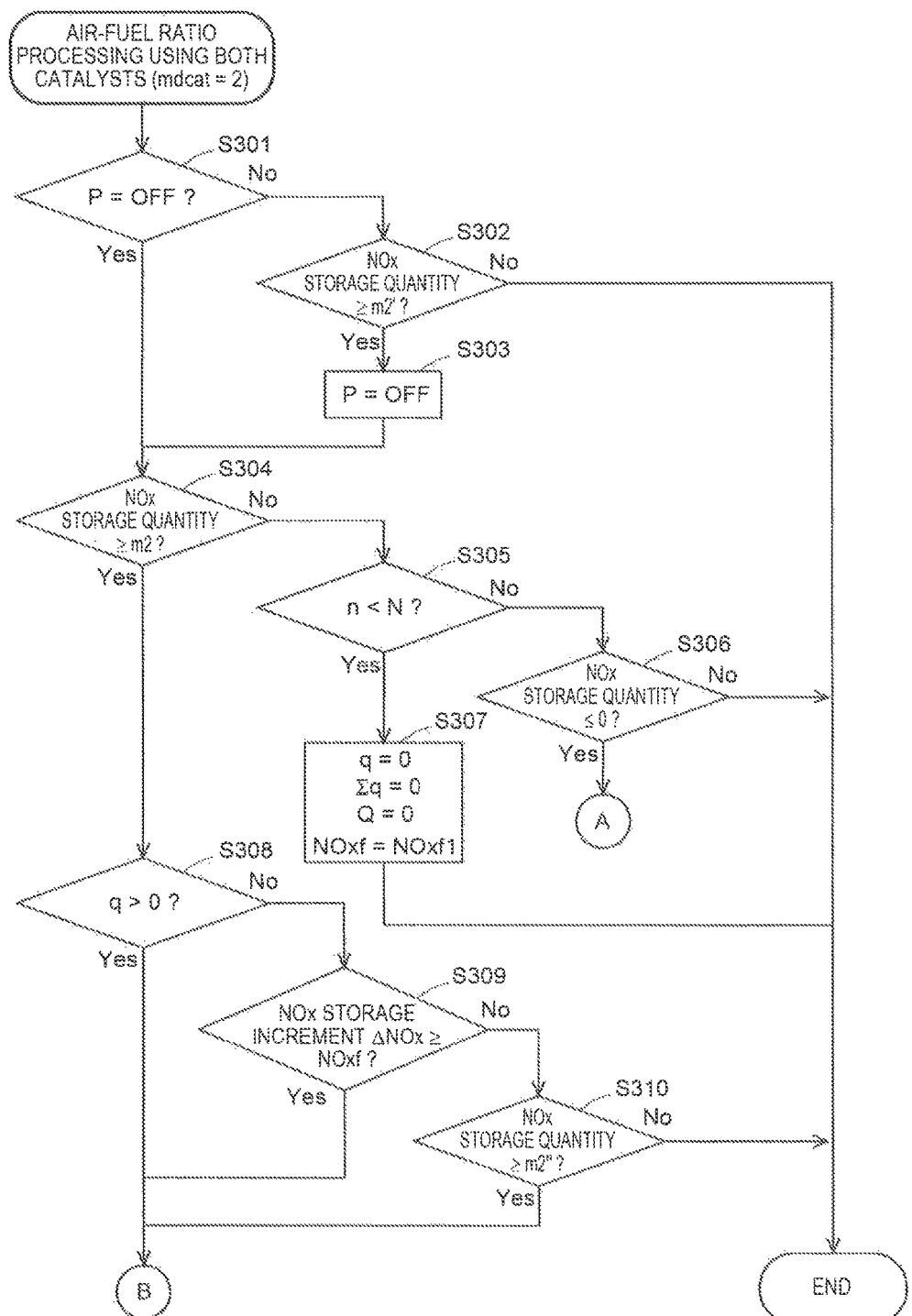
FIG. 6A is a first flowchart of air-fuel ratio processing using both the catalysts performed in the exhaust gas control system for an internal combustion engine illustrated in FIG. 1.
Figure 6B:
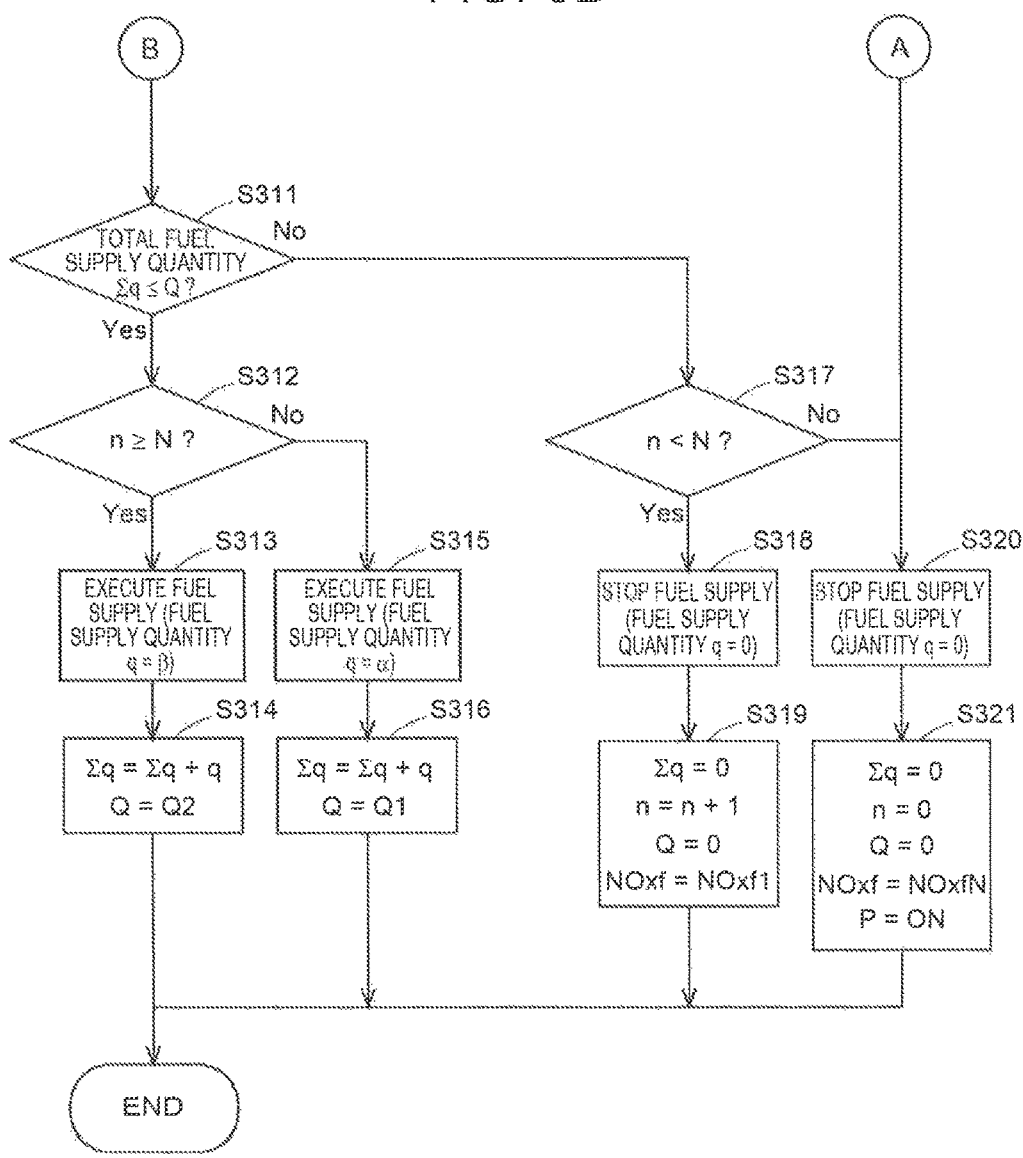
FIG. 6B is a second flowchart of the air-fuel ratio processing using both the catalysts performed in the exhaust gas control system for an internal combustion engine illustrated in FIG. 1.

Based on the above, the processing for the NOx reduction in the exhaust gas control system will be described with reference to FIGS. 4, 5, 6A and 6B. FIG. 4 is a flowchart of NSR-side setting processing for determining air-fuel ratio processing of the exhaust gas flowing into the NSR catalyst 3 at the time of performing NOx reduction by the NSR catalyst 3. A parameter mdcat determined in the NSR-side setting processing is a parameter for controlling the mode of fuel supply from the fuel supply valve 6 to the NSR catalyst 3. FIG. 5 is a flowchart of SCR-side setting processing for determining a urea water addition request from the addition valve 7 for NOx reduction by the SCR catalyst 5. When the urea water addition request determined in the SCR-side setting processing is set to ON, it signifies that urea water addition from the addition valve 7 is requested. FIGS. 6A and 6B are flowcharts of air-fuel ratio processing using both the catalysts that is air-fuel ratio processing involving fuel supply from the fuel supply valve 6, the air-fuel ratio processing using both the catalysts being executed when the parameter mdcat is set to "2" in the NSR-side setting processing. Each processing illustrated in FIGS. 4, 5, 6A and 6B is repeatedly and independently executed at predetermined intervals by control programs stored in the ECU 20.

First, the NSR-side setting processing will be described with reference to FIG. 4. In S101, it is determined whether or not the catalyst temperature of the NSR catalyst 3 is lower than a temperature TN1 that is a lower limit of the predetermined first temperature range illustrated in FIG. 2A. When positive determination is made in S101, it signifies that the catalyst temperature of the NSR catalyst 3 is out of the predetermined first temperature range. As a consequence, the processing proceeds to S102. In S102, the parameter mdcat is set to a value "0." When negative determination is made in S101, the processing proceeds to S103. In S103, it is determined whether or not the catalyst temperature of the NSR catalyst 3 is equal to or less than a temperature TN2 that is an upper limit of the predetermined first temperature range. When negative determination is made in S103, it signifies that the catalyst temperature of the NSR catalyst 3 is out of the predetermined first temperature range. As a consequence, the processing proceeds to S106. In S106, the parameter mdcat is set to a value "0."

Here, when positive determination is made in S103, it signifies that the catalyst temperature of the NSR catalyst 3 belongs to the first predetermined temperature range. Accordingly, when positive determination is made in S103, the processing proceeds to S104. In S104, it is determined whether or not the urea water addition request is set to ON. Specific setting processing of the urea water addition request will be described later with reference to FIG. 5. When the urea water addition request is set to ON, it signifies that addition of urea water from the addition valve 7 is requested for execution of NOx reduction by the SCR catalyst 5. When the urea water addition request is not set to ON, that is, when the urea water addition request is set to OFF, it signifies that the urea water addition from the addition valve 7 is not requested. When positive determination is made in S104, it signifies that in the situation where NOx reduction is performed by the SCR catalyst 5, the situation is formed where NOx reduction can be performed by the NSR catalyst 3 through fuel supply from the fuel supply valve 6. In such a case, in processing of S105, the parameter mdcat is set to a value "2." When negative determination is made in S104, it signifies that in the situation where NOx reduction is not performed by the SCR catalyst 5, the situation is formed where NOx reduction can be performed by the NSR catalyst 3 through fuel supply from the fuel supply valve 6. In such a case, in processing of S107, the parameter mdcat is set to a value "1."

Next, the SCR-side setting processing will be described with reference to FIG. 5. In S201, it is determined whether or not the catalyst temperature of the SCR catalyst 5 is lower than the temperature TS1 that is a lower limit of the predetermined second temperature range illustrated in FIG. 2B. When positive determination is made in S201, it signifies that the catalyst temperature of the SCR catalyst 5 is out of the predetermined second temperature range. As a consequence, the processing proceeds to S202. In S202, the urea water addition request is set to OFF. When negative determination is made in S201, the processing proceeds to S203.

In S203, it is determined whether or not the catalyst temperature of the SCR catalyst 5 is equal to or less than the temperature TS2 that is an upper limit of the predetermined second temperature range. When negative determination is made in S203, it signifies that the catalyst temperature of the SCR catalyst 5 is out of the predetermined second temperature range. As a consequence, the processing proceeds to S205. In S205, the urea water addition request is set to OFF.

Here, when positive determination is made in S203, it signifies that the catalyst temperature of the SCR catalyst 5 belongs to the predetermined second temperature range. Accordingly, when positive determination is made in S203, the processing proceeds to S204. In S204, the urea water addition request is set to ON.

According to the NSR-side setting processing and SCR-side setting processing described before, when the catalyst temperature of the SCR catalyst 5 belongs to the predetermined second temperature range, the urea water addition request is set to ON and thereby addition of urea water to the SCR catalyst 5 is executed from the addition valve 7. In the urea water addition processing, urea water addition may be controlled such that the ammonia adsorption quantity in the SCR catalyst 5 becomes a predetermined quantity or be controlled based on a parameter such as the NOx reducing rate of the SCR catalyst 5 and a difference between the detection values of the NOx sensors 11, 13.

For the NSR catalyst 3, processing relating to the air-fuel ratio of the exhaust gas flowing into the NSR catalyst 3 through fuel supply from the fuel supply valve 6 (simply referred to as "air-fuel ratio processing" below) is executed in accordance with the set value of the parameter mdcat. Specifically, when the parameter mdcat is set to "0", the catalyst temperature of the NSR catalyst 3 does not belong to the predetermined first temperature range. Accordingly, fuel supply from the fuel supply valve 6 is not performed. As a result, NOx reduction by the NSR catalyst 3 is not performed either. At this time, when the catalyst temperature of the NSR catalyst 3 is equal to or more than temperature TN0 illustrated in FIG. 2A, storage of NOx by the NSR catalyst 3 is performed, Next, when the value "1" is set to the parameter mdcat, NOx reduction by the NSR catalyst 3 is performed under the situation where NOx reduction is not performed in the SCR catalyst 5. Accordingly, when NOx reduction by the NSR catalyst 3 is performed, it is not necessary to take into consideration the condition for NOx reduction in the SCR catalyst 5. Accordingly, in the air-fuel ratio processing when the parameter mdcat is "1", the exhaust gas flowing into the NSR catalyst is adjusted to be a predetermined rich air-fuel ratio that is richer than the stoichiometric air-fuel ratio. Consequently, the NOx stored in the NSR catalyst 3 is emitted, and the emitted NOx is reduced with a fuel component in the exhaust gas as a reducing agent. The air-fuel ratio processing when the parameter mdcat is "1" may be performed when the quantity of stored NOx in the NSR catalyst 3 exceeds a predetermined quantity. That is, the air-fuel ratio processing is performed when the NOx storage quantity is increased to the level that the NSR catalyst 3 needs to secure the capacity that allows NOx storage. This makes it possible to keep execution frequency of the air-fuel ratio processing low and to suppress the consumption of fuel necessary for executing the air-fuel ratio processing.

When the parameter mdcat is set to a value "2", NOx reduction by the NSR catalyst 3 is performed under the situation where NOx reduction is performed in the SCR catalyst 5. Accordingly, when NOx reduction by the NSR catalyst 3 is performed, it is necessary to take into consideration the condition for NOx reduction in the SCR catalyst 5. In order to reduce the stored NOx in the NSR catalyst 3, fuel supply is performed from the fuel supply valve 6 to adjust the air-fuel ratio of the exhaust gas flowing into the NSR catalyst 3 to be the predetermined rich air-fuel ratio that is necessary for emitting the stored NOx and reducing the emitted NOx as in the case of the parameter indent being "1". Accordingly, when NOx reduction by the SCR catalyst 5 is performed, the SCR catalyst 5 is also exposed to stoichiometry or rich atmosphere.

Here, the reduction reaction of NOx in the SCR catalyst 5 is as illustrated in FIG. 3. The reduction reaction can be expressed by a following equation:

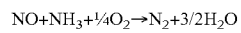

$$NO+NH_3+\tfrac{1}{4}O_2 \rightarrow N_2+3/2H_2O$$

As described in the foregoing, in the SCR catalyst 5, the continuous reduction reaction of NOx becomes possible only after a required quantity of oxygen is contained in the exhaust gas flowing into the SCR catalyst 5. Accordingly, when the air-fuel ratio of the exhaust gas flowing into the NSR catalyst 3 is simply adjusted to be the predetermined rich air-fuel ratio as in the case where the parameter mdcat is "1", and NOx reduction by the NSR catalyst 3 is performed, it becomes difficult to implement effective NOx reduction by the SCR catalyst 5.

Figure 7A:
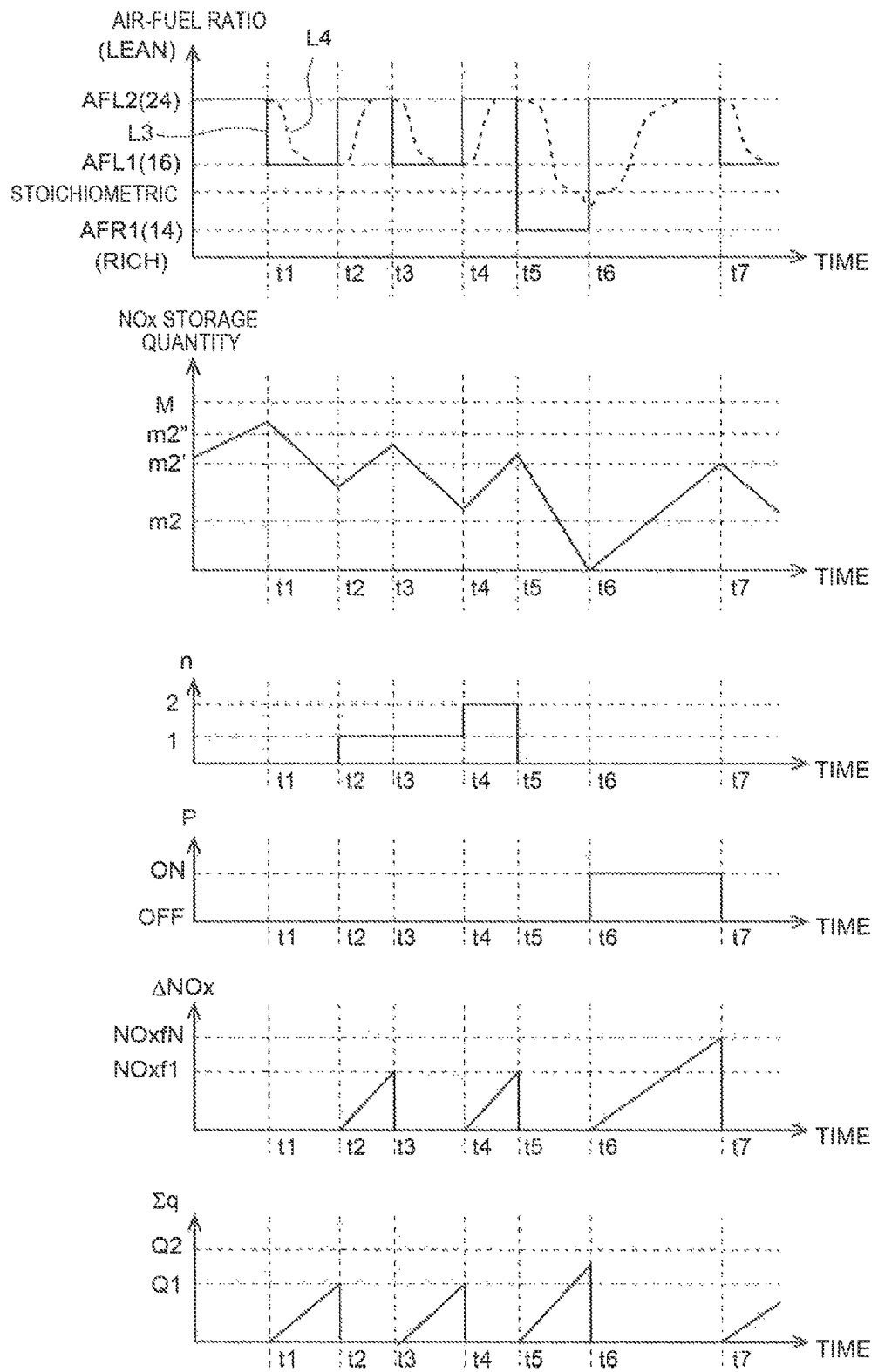
FIG. 7A is a first diagram illustrating transition of parameters relating to NOx reduction when the air-fuel ratio processing using both the catalysts illustrated in FIGS. 6A and 6B is executed.

Accordingly, based on issues in such a case of performing NOx reduction using both the NSR catalyst 3 and the SCR catalyst 5 described before, air-fuel ratio processing using both the catalysts illustrated in FIGS. 6A and 6B is executed in the exhaust gas control system for the internal combustion engine 1 of the present embodiment. The air-fuel ratio processing using both the catalysts is one example of the predetermined air-fuel ratio processing of the present disclosure. FIGS. 6A and 6B illustrate the air-fuel ratio processing using both the catalysts divided into two parts. FIGS. 7A and 7B illustrate transition of various parameters relating to NOx reduction when the air-fuel ratio processing using both the catalyst is executed. Specifically, FIG. 7A illustrates transition of each parameter including an air-fuel ratio of the exhaust gas flowing into the NSR catalyst 3 (transition illustrated with a solid line L3), an air-fuel ratio of the exhaust gas flowing out of the NSR catalyst 3 (transition illustrated with a broken line L4), ail NOx storage quantity in the NSR catalyst 3, a parameter n, a parameter P, an increment ΔNOx of NOx storage quantity (referred to as "NOx storage increment" below), and a total fuel supply quantity Σq. FIG. 7B illustrates transition of each parameter including the air-fuel ratio of the exhaust gas flowing into the NSR catalyst 3 and the air-fuel ratio of the exhaust gas flowing out of the NSR catalyst 3 (same as that in FIG. 7A), the NOx storage quantity in the NSR catalyst 3 (same as that in FIG. 7A), a parameter NOxf, an NOx concentration in the downstream of the NSR catalyst 3, and an NOx concentration in the downstream of the SCR catalyst 5.

Various parameters are defined as follows. The parameter n is a parameter representing a repeat count of the later-described first air-fuel ratio processing and the second air-fuel ratio processing. The parameter P is a parameter set to ON when execution of the later-described third air-fuel ratio processing is ended. That is, the parameter P being set to ON signifies that the NSR catalyst 3 is in the state where reduction of the stored NOx is completed by the third air-fuel ratio processing. The NOx storage quantity increment ΔNOx is a parameter representing an increment width of the NOx storage quantity incremented when NOx is stored in the NSR catalyst 3 while fuel supply from the fuel supply valve 6 is not performed. A reference time point (timing used as a reference for calculating the increment width) of NOx storage increment ΔNOx is the last time when fuel supply from the fuel supply valve 6 is stopped. The NOx storage quantity in the NSR catalyst 3 is calculated in accordance with the estimated quantity of NOx in the exhaust gas based on the operating state of the internal combustion engine 1. The total fuel supply quantity Σq is the total quantity of fuel supplied from the fuel supply valve 6 at predetermined time. The predetermined time starts at the time point when the total fuel supply quantity Σq is reset in the air-fuel ratio processing using both the catalysts illustrated in FIGS. 6A and 6B. A value q is the quantity of fuel supplied from the fuel supply valve 6 per unit time. The parameter NOxf is a parameter for setting an upper limit of the NOx storage increment ΔNOx. The parameters used in the air-fuel ratio processing using both the catalysts in FIGS. 6A and 6B also include a parameter Q which does not represent transition in FIGS. 7A and 7B. The parameter Q relates to the total quantity of fuel supplied from the fuel supply valve 6, the total quantity being necessary for emission of a target quantity of stored NOx from the NSR catalyst 3.

First in S301, it is determined whether or not the parameter P is set to OFF. When positive determination is made in S301, the processing proceeds to S304. When negative determination is made, the processing proceeds to S302. Next, in S302, it is determined whether or not the NOx storage quantity in the NSR catalyst 3 is equal to or more than a start reference NOx storage quantity m2' that is a threshold value for determining whether or not the later-described first air-fuel ratio processing in S315 should be started to reduce the NOx storage quantity and to recover the NOx storage capacity of the NSR catalyst 3. When positive determination is made in S302, the processing proceeds to S303. When negative determination is made, the air-fuel ratio processing using both the catalysts is ended. Next, in S303, the parameter P set to ON is set to OFF. When the processing of S303 is ended, the processing proceeds to S304.

In S304, it is determined whether or not the NOx storage quantity in the NSR catalyst 3 is equal to or more than a lower limit threshold value m2 that is a lower limit of the NOx storage quantity required to prevent the fuel supplied from the fuel supply valve 6 from flowing out to the downstream side without being used for NOx reduction reaction in the NSR catalyst 3 when the later-described third air-fuel ratio processing in S313 is executed. When positive determination is made in S304, the processing proceeds to S308. When negative determination is made, the processing proceeds to S305. In S305, it is determined whether or not the parameter n is less than N that is a specified value of the repeat count of the later-described first air-fuel ratio processing in S315 and the later-described second air-fuel ratio processing in S318, the first air-fuel ratio processing and the second air-fuel ratio processing being repeatedly executed before execution of the later-described third air-fuel ratio processing in S313. When positive determination is made in S305, the processing proceeds to S307. When negative determination is made, the processing proceeds to S306. In S306, it is determined whether or not the NOx storage quantity in the NSR catalyst 3 is zero or less. When positive determination is made in S306, the processing proceeds to S320. When negative determination is made, the air-fuel ratio processing using both the catalysts is ended. In S307, the fuel supply quantity q per unit time is set to "0", the total fuel supply quantity Σq is set to "0", the parameter Q is set to "0", and the parameter NOxf is set to NOxf1. Then, the air-fuel ratio processing using both the catalysts is ended.

When positive determination is made in S304, the processing proceeds to S308. In S308, it is determined whether or not the fuel supply quantity q per unit time is larger than zero, that is, whether or not fuel supply from the fuel supply valve 6 is performed. When positive determination is made in S308, the processing proceeds to S311. When negative determination is made, the processing proceeds to S309. In S309, it is determined whether or not the NOx storage increment ΔNOx is equal to or more than a set value of the parameter NOxf. Here, in the air-fuel ratio processing using both the catalysts, the value set as the parameter NOxf is one of NOxf1 set in S307 or S319 described later and NOxfN (NOxfN>NOxf1) set in S321 described later. The set values are for executing predetermined processing with use of the NOx storage increment ΔNOx in the NSR catalyst 3 as a trigger. The detailed description thereof will be given later. When positive determination is made in S309, the processing proceeds to S311. When negative determination is made, the processing proceeds to S310. In S310, it is determined whether or not the NOx storage quantity in the NSR catalyst 3 is equal to or more than an upper limit threshold value m2" that is a substantial upper limit of the NOx storage quantity when the air-fuel ratio processing using both the catalysts is executed. When positive determination is made in S310, the processing proceeds to S311. When negative determination is made, the air-fuel ratio processing using both the catalysts is ended.

Next, in S311, it is determined whether or not the total fuel supply quantity Σq is equal to or less than a set value of the parameter Q. Here, in the air-fuel ratio processing using both the catalysts, the value set for the parameter Q is any one of Q2 set in S314 described later, Q1 (0<Q1<Q2) set in S316 described later, and "0" set in S319 and S321 described later. The set values are used to determine whether or not the total fuel supply quantity Σq from the fuel supply valve 6 causes emission of an assumed quantity of stored NOx from the NSR catalyst 3 or causes reduction thereof. The detail thereof will be described later. When positive determination is made in S311, the processing proceeds to S312. When negative determination is made, the processing proceeds to S317.

In S312, it is determined whether or not the parameter n is equal to or more than the specified value N of the repeat count of the later-described first air-fuel ratio processing in S315 and the later-described second air-fuel ratio processing in S318. When positive determination is made in S312, the processing proceeds to S313. When negative determination is made, the processing proceeds to S315. In S313, fuel supply from the fuel supply valve 6 is executed, and the fuel supply quantity q per unit time is set to β. Through the fuel supply in S313, the air-fuel ratio of the exhaust gas flowing into the NSR catalyst 3 is adjusted to a predetermined rich air-fuel ratio AFR1 which enables the NSR catalyst 3 to emit and reduce stored NOx. Therefore, the processing in S313 for forming the exhaust gas having the predetermined rich air-fuel ratio AFR1 is one example of the third air-fuel ratio processing of the present disclosure. The predetermined rich air-fuel ratio AFR1 is about 14, for example. Then, in S314 after the processing of S313, the quantity of fuel supplied in S313 is integrated, so that the total fuel supply quantity Σq is updated, and the parameter Q is set to Q2. The value Q2 is the total supply quantity of fuel corresponding to the storage quantity of NOx emitted from and reduced by the NSR catalyst 3 in the third air-fuel ratio processing. After the processing of S314, the air-fuel ratio processing using both the catalysts is ended.

Next, in S315, fuel supply from the fuel supply valve 6 is executed, and the fuel supply quantity q per unit time is set to α (α<β). Through the fuel supply in S315, the air-fuel ratio of the exhaust gas flowing into the NSR catalyst 3 is adjusted to be the first lean air-fuel ratio. The first lean air-fuel ratio is an air-fuel ratio leaner than the stoichiometric air-fuel ratio, the first lean air-fuel ratio enabling the NSR catalyst 3 to emit stored NOx. For example, the first lean air-fuel ratio is about 16. Therefore, the processing of S315 for forming the exhaust gas having the first lean air fuel ratio is one example of the first air-fuel ratio processing of the present disclosure. Then, in S316 after the processing of S315, the quantity of fuel supplied in S315 is integrated, so that the total fuel supply quantity Σq is updated, and the parameter Q is set to Q1. The value Q1 is the total supply quantity of fuel corresponding to the quantity of the stored NOx assumed to be emitted from the NSR catalyst 3 in the first air-fuel ratio processing. After the processing of S316, the air-fuel ratio processing using both the catalysts is ended.

When negative determination is made in S311, the processing proceeds to S317. In S317, it is determined whether or not the parameter a is smaller than the specified value N of the repeat count of the first air-fuel ratio processing in S315 and the second air-fuel ratio processing in S318. When positive determination is made in S317, the processing proceeds to S318. When negative determination is made, the processing proceeds to S320. In S318, the fuel supply from the fuel supply valve 6 is stopped. Therefore, the fuel supply quantity q per unit time in this case becomes "0." Since the fuel supply is stopped in 318, the air-fuel ratio of the exhaust gas flowing into the NSR catalyst 3 is adjusted to be the second lean air-fuel ratio that is an air-fuel ratio leaner than the first lean air-fuel ratio formed in S315. Therefore, the processing of S318 for forming the exhaust gas having the second lean air-fuel ratio is one example of the second air-fuel ratio processing of the present disclosure. The second lean air-fuel ratio is about 24, for example. Then in S319 after processing of S318, the total fuel supply quantity Σq is set to "0", the parameter n is incremented, the parameter Q is set to "0", and the parameter NOxf is set to NOxf1. The set value NOxf1 is a target value of the NOx storage quantity which increases in the NSR catalyst 3, while the second air-fuel ratio processing is performed. After the processing of S319, the air-fuel ratio processing using both the catalysts is ended.

Next, in S320, the fuel supply from the fuel supply valve 6 is stopped. Therefore, the fuel supply quantity q per unit time in this case becomes "0," Since the fuel supply is stopped in S318, the air-fuel ratio of the exhaust gas flowing into the NSR catalyst 3 is adjusted to be the air-fuel ratio same as the second lean air-fuel ratio formed in S318. Then in S321 after processing of S320, the total fuel supply quantity Σq is set to "0", the parameter n is set to "0", the parameter Q is set to "0", and the parameter NOxf is set to NOxfN. The set value NOxfN is a target value of the NOx storage quantity which increases in the NSR catalyst 3, while the stop of fuel supply in S320 continues. For example, the set value NOxfN may be equivalent of m2'. Furthermore, the parameter P is set to ON. After the processing of S321, the air-fuel ratio processing using both the catalysts is ended.

The parameters n and P, the NOx storage increment ΔNOx, the total fuel supply quantity Σq, the fuel supply quantity q per unit time, and the parameters NOxf and Q are reset when the value of the parameter mdcat is changed by the NSR-side setting processing. Specifically, the parameter n is reset to "0", the parameter P is reset to OFF, and the NOx storage increment ΔNOx is reset to "0." The total fuel supply quantity Σq is reset to "0", the fuel supply quantity q per unit time is reset to "0", the parameter NOxf is reset to NOxfN, and the parameter Q is reset to "0." Furthermore, the parameters are also reset when the internal combustion engine 1 is started upon the ignition being turned on.

Here, the flow of the air-fuel ratio processing using both the catalysts illustrated in FIGS. 6A and 6B is described based on transition of the parameters relating to NOx reduction illustrated in FIGS. 7A and 7B. FIGS. 7A and 7B illustrate typical time t1 to t7 when the air-fuel ratio processing using both the catalysts is executed. Hereinafter, the flow of the air-fuel ratio processing using both the catalysts is described along the passage of time.

First, in a period to time t1, the parameter mdcat is set to "0" by the NSR-side setting processing. Accordingly, since the exhaust gas discharged from the internal combustion engine 1 directly flows into the NSR catalyst 3, the air-fuel ratio of the exhaust gas becomes AFL2 (having an air-fuel ratio value of about 24) that is leaner than the stoichiometric air-fuel ratio. The NOx storage quantity in the NSR catalyst 3 increases with the passage of time (a value M illustrated in transition of the NOx storage quantity in FIGS. 7A and 7B is a threshold value used as a trigger to adjust the air-fuel ratio of the exhaust gas to be the predetermined rich air-fuel ratio, when mdcat is set to "1"). At this time, it is assumed that the catalyst temperature of the SCR catalyst 5 belongs to the predetermined second temperature range, the urea water addition request is set to ON in the SCR-side setting processing, and urea water addition from the addition valve 7 is performed. Thus, since the air-fuel ratio processing using both the catalysts is not executed in the period to time t1, the parameter n is "0", the parameter P is OFF, and the NOx storage increment ΔNOx, the total fuel supply quantity Σq, and the parameter NOxf are "0". Since the NSR catalyst 3 stores NOx in the exhaust gas in such circumstances, the NOx concentration on the downstream side of the NSR catalyst 3 is considerably low. Since the SCR catalyst 5 reduces NOx with urea water added from the addition valve 7 and with ammonia as a reducing agent, the NOx concentration on the downstream side of the SCR catalyst 5 is lower.

At time t1, the catalyst temperature of the NSR catalyst 3 belongs to the predetermined first temperature range, and the parameter mdcat is set to "2" in the NSR-side setting processing. As a result, the air-fuel ratio processing using both the catalysts is started. Since the parameter P is set to OFF when the air-fuel ratio processing using both the catalysts is started, positive determination is made in S301. Furthermore, since the NOx storage quantity in the NSR catalyst 3 is over m2, positive determination is made in S304. Since fuel supply from the fuel supply valve 6 is not yet started, negative determination is made in S308. However, in S309, positive determination is made since the NOx storage increment ΔNOx is "0" and the parameter NOxf is "0". Furthermore, in next S311, since the total fuel supply quantity q is "0" and the parameter Q is "0" either, positive determination is made. Furthermore, in S312, since the parameter n is "0", and the specified value N is preset to "2" (the repeat count is two) in the present embodiment, negative determination is made. As a result, at time t1, the first air-fuel ratio processing is started in S315. At this time, the air-fuel ratio of the exhaust gas flowing into the NSR catalyst 3 becomes a first lean air-fuel ratio AFL1. Then, in S316, the fuel supply quantity q from the fuel supply valve 6 is integrated, and the parameter Q is set to Q1. As described before, the value Q1 is the fuel quantity corresponding to the quantity of the stored NOx assumed to be emitted from the NSR catalyst 3 in the first air-fuel ratio processing. That is, the value Q1 is the total quantity of fuel required to emit an assumed quantity of stored NOx in the range where the quantity of NOx outflow from the exhaust gas control system can be suppressed during the first air-fuel ratio processing.

When the processing of S316 is ended, the air-fuel ratio processing using both the catalysts is repeated again from S301. Accordingly, after the first air-fuel ratio processing is started at time t1, positive determination is made in S301. After positive determination is made in S304, positive determination is made in S308, so that the processing reaches S311. Although the total fuel supply quantity Σq is increased by the first air-fuel ratio processing, it does not yet reach Q1 set in S316. Accordingly, in S311, positive determination is made. In subsequent S312, negative determination is made as before since the parameter a is unchanged.

As described in the foregoing, in a period after time t1 and before time t2 described later, the first air-fuel ratio processing continues. Consequently, the NOx stored in the NSR catalyst 3 is emitted and thereby the NOx storage quantity is decreased. Since the emitted NOx has the first lean air-fuel ratio that is leaner than the stoichiometric air fuel ratio, the NOx is not reduced in the NSR catalyst 3, but flows into the SCR catalyst 5, When the air-fuel ratio of the exhaust gas flowing into the NSR catalyst 3 is adjusted to be the first lean air-fuel ratio, the air-fuel ratio of the exhaust gas flowing out of the NSR catalyst 3 (i.e., the air fuel ratio of the exhaust gas flowing into the SCR catalyst 5) does not immediately approximate the first lean air-fuel ratio (see the transition of the broken line L4). At this time, in the SCR catalyst 5, the air-fuel ratio of the exhaust gas that allows continuous reduction of NOx is maintained. Therefore, the NOx emitted from the NSR catalyst 3 is adequately reduced by the SCR catalyst 5.

When the first air-fuel ratio processing continues to some extent, the air-fuel ratio of the exhaust gas flowing into the SCR catalyst 5 also becomes the first lean air-fuel ratio AFL1. Although the first lean air-fuel ratio AFL1 is an air-fuel ratio leaner than the stoichiometric air fuel ratio, it is still the air-fuel ratio formed by fuel supply from the fuel supply valve 6 performed in the first air-fuel ratio processing. Therefore, the first air-fuel ratio hinders smooth valence recovery of the copper ion in the SCR catalyst 5, which results in deterioration in the NOx reducing performance of the SCR catalyst 5. Accordingly, in the present embodiment, negative determination is made in S311, so that the first air-fuel ratio processing is terminated when the total fuel supply quantity Σq exceeds Q1 set in S316. In FIGS. 7A and 7B, the time when negative determination is made because the total fuel supply quantity Σq exceeds Q1 in S311 is time t2.

Alternatively, coming of time t2 may be determined when the air-fuel ratio of the exhaust gas flowing out of the NSR catalyst 3 detected by the air fuel ratio sensor 10 becomes the first lean air-fuel ratio AFL1, and thereby the NOx reducing performance of the SCR catalyst 5 is deteriorated. Further alternatively, corning of time t2 may be determined when the NOx reducing rate by the SCR catalyst 5 calculated by the NOx sensors 11, 13 becomes less than a reference reducing rate, and thereby the NOx reducing performance of the SCR catalyst 5 is deteriorated. Still alternatively, coming of time t2 may be determined when the detection value of the NOx sensor 13 disposed on the downstream side of the SCR catalyst 5 exceeds a reference NOx concentration relating to NOx outflow from the SCR catalyst 5 attributed to deterioration in the NOx reduction efficiency in the SCR catalyst 5, and thereby the NOx reducing performance of the SCR catalyst 5 is deteriorated.

Accordingly, when negative determination is made in S311, the processing proceeds to S317. At this time, since the parameter n is unchanged, positive determination is made in S317. As a result, at time t2, the second air-fuel ratio processing is started in S318. At this time, the air-fuel ratio of the exhaust gas flowing into the NSR catalyst 3 becomes the second lean air-fuel ratio AFL2. Then, in S319, the total fuel supply quantity is reset to "0", and the parameter n is incremented to "1." The parameter Q is also reset to "0." Furthermore, the parameter NOxf is set to NOxf1. The NOxf1 is a target value of the NOx storage quantity which increases in the NSR catalyst 3, while the second air-fuel ratio processing is performed. That is, the NOxf1 is a threshold value for determining the length of the execution period of the second air-fuel ratio processing from a viewpoint of increase in the NOx storage quantity.

When the processing of S319 is ended, the air-fuel ratio processing using both the catalysts is repeated again from S301. Accordingly, after the second air-fuel ratio processing is started at time t2, positive determination is made in S301. Since the NOx storage quantity in the NSR catalyst 3 increases with execution of the second air-fuel ratio processing, positive determination is also made in S304. Then, negative determination is made in S308 since fuel supply from the fuel supply valve 6 is stopped. Then, in S309, it is determined whether or not the NOx storage increment ΔNOx from time t2 that is the latest fuel supply stop time is equal to or more than NOxf1 set in S319 before. Therefore, when the period in which the second air-fuel ratio processing continues after time t2 is short, the NOx storage increment ΔNOx does not reach NOxf1. In this case, the processing proceeds to S310. In S310, determination is made based on the NOx storage quantity in the NSR catalyst 3. With such a configuration, in the case where the NOx storage increment ΔNOx does not yet reach NOxf1 and the NOx storage quantity is smaller than the upper limit threshold value m2", the air-fuel ratio processing using both the catalysts is ended once and is restarted. That is, the second air-fuel ratio processing continues.

When the duration of the second air-fuel ratio processing is prolonged to some extent, and the NOx storage increment ΔNOx reaches NOxf1 (positive determination in S309) or the NOx storage quantity becomes the upper limit threshold value m2" or more (positive determination in S310), processing subsequent to S311 is performed and the second air-fuel ratio processing is stopped. In short, in the present embodiment, the duration (predetermined period according to the present disclosure) of the second air-fuel ratio processing is the time until the increase in the NOx storage quantity in the NSR catalyst 3 reaches the predetermined quantity (NOxf1) due to the second air-fuel ratio processing, or the time until the NOx storage quantity itself reaches the quantity (m2") set to prevent excessive increase of the NOx storage quantity. Alternatively, when the air-fuel ratio of the exhaust gas flowing out of the NSR catalyst 3 detected by the air fuel ratio sensor 10 upon execution of the second air-fuel ratio processing becomes the second lean air-fuel ratio AFL2 or an air-fuel ratio in the vicinity of the second lean air-fuel ratio AFL2 (also referred to as "air-fuel ratio such as the second lean air-fuel ratio AFL2" below), the second air-fuel ratio processing may be stopped, and the processing subsequent to S311 may be performed. This is because when the air-fuel ratio of the exhaust gas flowing out of the NSR catalyst 3 becomes an air-fuel ratio such as the second lean air-fuel ratio AFL2, it is considered that oxygen required for valence recovery of the copper ion in the SCR catalyst 5 can soon be supplied to the SCR catalyst 5 positioned on the downstream side of the NSR catalyst 3. When the processing proceeds to S311, the total fuel supply quantity Σq and the parameter Q are "0". Accordingly, positive determination is made in S311. In subsequent S312, since the parameter n is "1", negative determination is made. As a result, the processing proceeds to S315, so that the second air-fuel ratio processing is ended. Then, the first air-fuel ratio processing is started for the second time, and the start time of the processing is time t3. In FIGS. 7A and 7B, time t3 comes when the NOx storage increment ΔNOx reaches NOxf1.

Once the first air-fuel ratio Processing is started for the second time in S315 at time t3, then in S316, the fuel supply quantity q from the fuel supply valve 6 is integrated (the total fuel supply quantity Σq in this case is the total quantity on the basis of the start time of the first air-fuel ratio processing for the second time). At the same time, the parameter Q is set to Q1, and the air-fuel ratio processing using both the catalysts is again repeated from S301. The subsequent flow of the first air-fuel ratio processing for the second time continues until it is determined in S311 that the total fuel supply quantity Σq exceeds Q1 set in S316 (negative determination is made in S311) as in the case of the aforementioned first air-fuel ratio processing for the first time. Then, when negative determination is made in S311, the processing proceeds to S317. Since the parameter n is "1" at this time, positive determination is made in S317. As a result, the processing proceeds to S318, and the second air-fuel ratio processing is started for the second time. The time when the second air-fuel ratio processing is started is time t4.

When the second air-fuel ratio processing is started for the second time at time in S318 at t4, then in S319, the total fuel supply quantity Σq is reset to "0" and the parameter n is incremented to "2," The parameter Q is also reset to "0." Furthermore, the parameter NOxf is set to NOxf1. Then, the air-fuel ratio processing using both the catalysts is repeated again from S301. The subsequent flow of the second air-fuel ratio processing for the second time continues until the NOx storage increment ΔNOx reaches NOxf1 (positive determination in S309) or the NOx storage quantity becomes the upper limit threshold value m2" or more (positive determination in S310) as in the case of the aforementioned second air-fuel ratio processing for the first time. Then, in S311, since the total fuel supply quantity Σq and the parameter Q are "0", positive determination is made and the processing proceeds to S312. At this time, since the parameter a is "2", positive determination is made in S312. As a result, the processing proceeds to S313, where the third air-fuel ratio processing is started. The time when the third air-fuel ratio processing is started is time t5.

Once the third air-fuel ratio processing is started in S313 at time t5, then in S314, the fuel supply quantity q from the fuel supply valve 6 is integrated (the total fuel supply quantity Σq in this ease is the total quantity on the basis of the start time of the third air-fuel ratio processing). At the same time, the parameter Q is set to Q2, and the air-fuel ratio processing using both the catalysts is again repeated from S301. As described before, the value Q2 is the total fuel quantity corresponding to the quantity of the stored NOx assumed to be emitted from the NSR catalyst 3 and be reduced in the third air-fuel ratio processing. That is, the value Q2 is the total quantity of fuel required to emit and reduce an assumed quantity of stored NOx in the range where the quantity of NOx flowing out from the exhaust gas control system can be suppressed during the third air-fuel ratio processing.

Since the parameter P is set to OFF at time t5, positive determination is made in S301, and the processing proceeds to S304. In S304, it is determined whether or not the NOx storage quantity in the NSR catalyst 3 is equal to or more than the lower limit threshold value m2. When the NOx storage quantity in the NSR catalyst 3 is equal to or more than lower limit threshold value m2 during the third air-fuel ratio processing, positive determination is made in S304, and positive determination is further made in S308. As a consequence, the processing proceeds to determination in S311. In S311, it is determined whether or not the total fuel supply quantity Σq is equal to or less than Q2. The purpose of the determination is to prevent excessively prolonged third air-fuel ratio processing which may cause emission deterioration. If the execution period of the third air-fuel ratio processing is prolonged and therefore negative determination is made in S311, negative determination is made in S317, and the processing proceeds to S320 where fuel supply from the fuel supply valve 6 is stopped. Due to the stop of fuel supply in S320, the air-fuel ratio of the exhaust gas blowing into the NSR catalyst 3 is adjusted to be an air-fuel ratio same as the second lean air-fuel ratio AFL2. Then, in S321, the total fuel supply quantity Σq is reset to "0", and the parameter n is also reset to "0." The parameter Q is also reset to "0." Furthermore, the parameter NOxf is set to NOxfN. The value NOxfN is a target value of the NOx storage quantity which increases in the NSR catalyst 3 while the fuel supply from the fuel supply valve 6 is stopped after the third air-fuel ratio processing so as to adjust the air-fuel ratio of the exhaust gas to be the air-fuel ratio same as the second lean air-fuel ratio AFL2. That is, the NOxfN is a threshold value for determining the length of the period where fuel supply is stopped from a viewpoint of increase in the NOx storage quantity. When positive determination is made in S311, and the positive determination is made in S312, the third air-fuel ratio processing in S313 continues.

When the NOx storage quantity in the NSR catalyst 3 becomes smaller than the lower limit threshold value m2 during the third air-fuel ratio processing, negative determination is made in S304. Then, when negative determination is made in S305, the processing proceeds to S306. In S306, it is determined whether or not the NOx storage quantity in the NSR catalyst 3 is zero or less. When the NOx storage quantity does not reach "0", the air-fuel ratio processing using both the catalysts is ended and repeated again. In the meantime, the third air-fuel ratio processing is continuously executed. When the NOx storage quantity reaches "0" in the third air-fuel ratio processing, positive determination is made in S306. Then, in S320, fuel supply from the fuel supply valve 6 for the third air-fuel ratio processing is stopped as described before. Then, after the processing of S321, the air-fuel ratio processing using both the catalysts is ended and repeated again. Thus, time t6 illustrated in FIGS. 7A and 7B is the time point when the processing of S321 is performed after positive determination is made in S306, and the third air-fuel ratio processing is stopped in S320. Therefore, FIGS. 7A and 7B illustrate the transition of the respective parameters when the third air-fuel ratio processing continues until the NOx storage quantity in the NSR catalyst 3 becomes zero without negative determination is made in S311 during the third air-fuel ratio processing.

The processing of S307 illustrated in FIG. 6A is the processing executed when the NOx storage quantity in the NSR catalyst 3 becomes equal to or less than m2 while emission of the stored NOx from the NSR catalyst 3 is performed in the first air-fuel ratio processing. In this case, the air-fuel ratio processing using both the catalysts is ended in the state where fuel supply is stopped in S307 (fuel supply quantity per unit time q=0), the parameter Q and the total fuel supply quantity are set to "0", the parameter NOxf is set to NOxf1, and the first air-fuel ratio processing is stopped. Then, the air-fuel ratio processing using both the catalysts is resumed in the state where the fuel supply from the fuel supply valve 6 is stopped. As a result, the state of the fuel supply being stopped continues until the NOx storage increment ΔNOx becomes equal to or more than NOxf1 (positive determination is made in S309), or the NOx storage quantity in the NSR catalyst 3 becomes equal to or more than the upper limit threshold value m2" (positive determination is made in S310). When the NOx storage increment ΔNOx becomes equal to or more than NOxf1, or the NOx storage quantity in the NSR catalyst 3 becomes equal to or more than the upper limit threshold value m2", the first air-fuel ratio processing is started again in the processing of S315 after positive determination is made in S311 and negative determination is made in S312.

Now, FIGS. 7A and 7B are referred again. At time t6, the third air-fuel ratio processing is stopped as described in the foregoing, and then, the exhaust gas having the air-fuel ratio same as the second lean air-fuel ratio AFL2 flows into the NSR catalyst 3. As a result, as illustrated in FIG. 7A, the NOx storage quantity in the NSR catalyst 3 increases with the passage of time. Thus, in the period after time t6, negative determination is made in S301 since the parameter P is set to ON in S321. Then, determination of S302 is performed. The stop of fuel supply from the fuel supply valve 6 continues and the NOx storage quantity in the NSR catalyst 3 increases until positive determination is made in S302, that is, until the NOx storage quantity in the NSR catalyst 3 is determined to be equal to or more than the start reference NOx storage quantity m2'. Then, when positive determination is made in S302, the parameter P is set to OFF in S303. Then, after time t7, when positive determination is made in S304, negative determination is made in S308, and then the NOx storage increment ΔNOx is determined to be equal to or more than NOxfN in S309 (positive determination), the first air-fuel ratio processing is started in S315 after the positive determination is made in S311 and the negative determination is made in S312. The time when the first air-fuel ratio processing is started is time t7. After time t7, execution of the air-fuel ratio processing using both the catalysts continues as long as the parameter mdcat is set to "2" in the NSR-side setting processing.

Thus, in the exhaust gas control system of the present embodiment, when NOx reduction is performed using the NSR catalyst 3 and the SCR catalyst 5, the first air-fuel ratio processing and the second air-fuel ratio processing are alternately executed two times each. The third air-fuel ratio processing is executed in succession to the last second air-fuel ratio processing. Accordingly, the NOx storage quantity in the NSR catalyst 3 is decreased by repeating the first air-fuel ratio processing and the second air-fuel ratio processing, and the NOx emitted during the processing is reduced by the SCR catalyst 5, while valence recovery of the copper ion in the SCR catalyst 5 is achieved. As a result, reduction treatment of the emitted NOx is adequately performed by the SCR catalyst 5, which suppresses discharge of NOx to the outside of the system. Since the third air-fuel ratio processing causes execution of the second air-fuel ratio processing immediately before the NSR catalyst 3 reduces the NOx stored in the NSR catalyst 3, the NOx reducing performance of the SCR catalyst 5 is also recovered due to the valence recovery of the copper ion in the SCR catalyst 5. Therefore, even when relatively rich exhaust gas flows into the NSR catalyst 3 and some of the stored NOx flows out to the downstream side due to the third air-fuel ratio processing, the quantity of NOx outflow is kept low since the NOx storage quantity is decreased at the time when the third air-fuel ratio processing is started. Although the content of oxygen in the exhaust gas flowing into the SCR catalyst 5 is low due to the third air-fuel ratio processing, the quantity of NOx flowing out from the NSR catalyst 3 is also low as described in the foregoing, and the NOx reducing performance of the SCR catalyst 5 is also recovered by the second air-fuel ratio processing executed immediately before the third air-fuel ratio processing. Accordingly, the SCR catalyst 5 can perform adequate reduction treatment of NOx flowing out in the third air-fuel ratio processing, which can suppress discharge of NOx to the outside of the system.

Therefore, in order to suppress discharge of NOx from the exhaust gas control system to the outside as much as possible, the fuel supply quantity α from the fuel supply valve 6 per unit time at the time of the first air-fuel ratio processing is preferably the fuel supply quantity that is an emission quantity of NOx reducible in the SCR catalyst 5 on the downstream side. The repeat count of the first air-fuel ratio processing and the second air-fuel ratio processing, and the duration of each air-fuel ratio processing may be set so as to adjust the quantity of NOx flowing out from the NSR catalyst 3 to the downstream side when the third air-fuel ratio processing to be the quantity reducible in the SCR catalyst 5 whose reducing performance is recovered.

In the second air-fuel ratio processing, the second lean air-fuel ratio AFL2 is formed by stopping the fuel supply from the fuel supply valve 6 in S318. Instead of this mode, in S318, the fuel supply quantity from the fuel supply valve 6 may be regulated to the quantity smaller than the value α, in the range where the valence of the copper ion in the SCR catalyst 5 can be recovered. As a result, the air-fuel ratio of the exhaust gas flowing into the SCR catalyst 5 is made to be leaner than the first lean air-fuel ratio AFL1.

Figure 8:
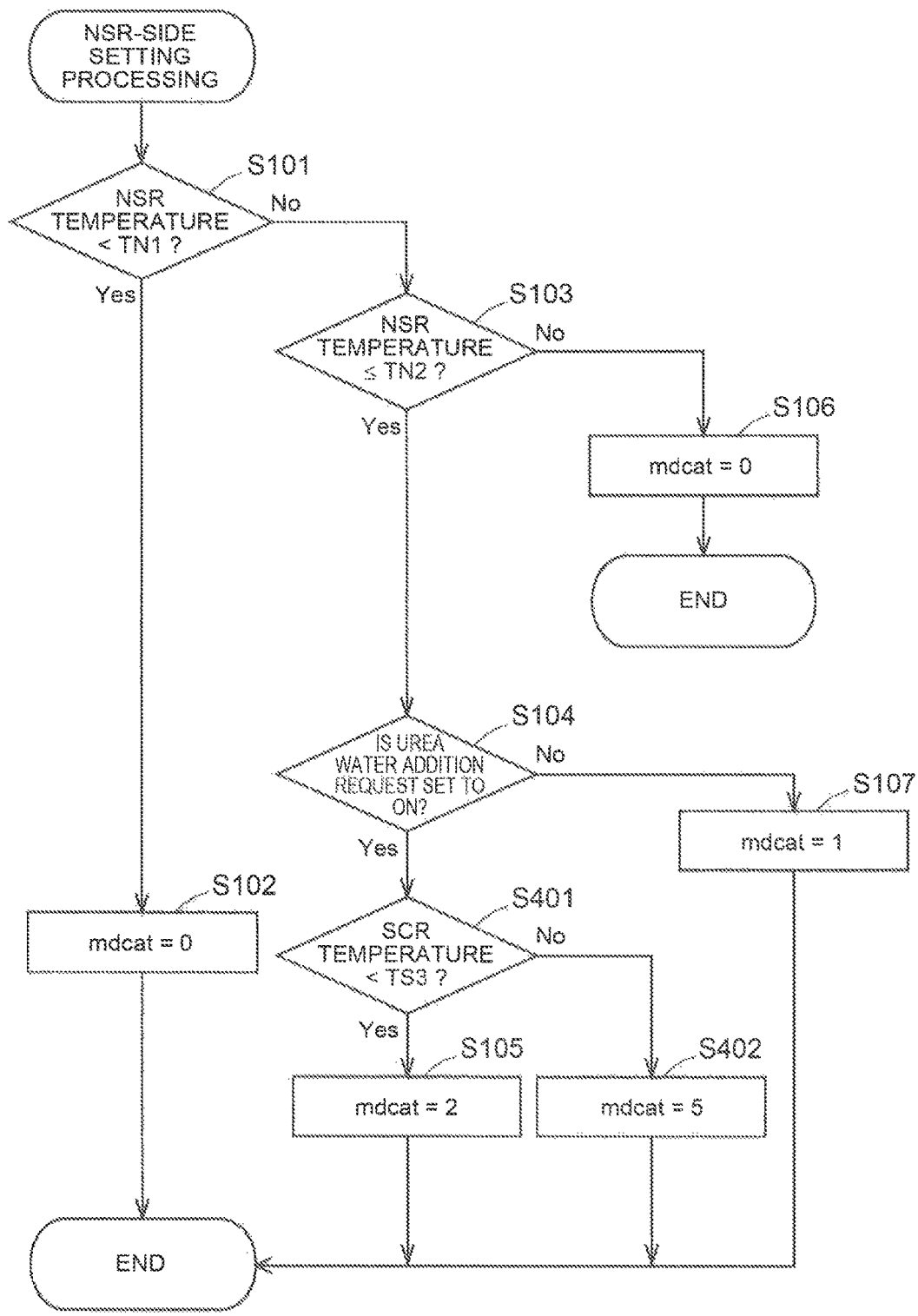
FIG. 8 is a flowchart of second NSR-side setting processing for determining air-fuel ratio processing performed in the exhaust gas control system for an internal combustion engine illustrated in FIG. 1.
Figure 9:
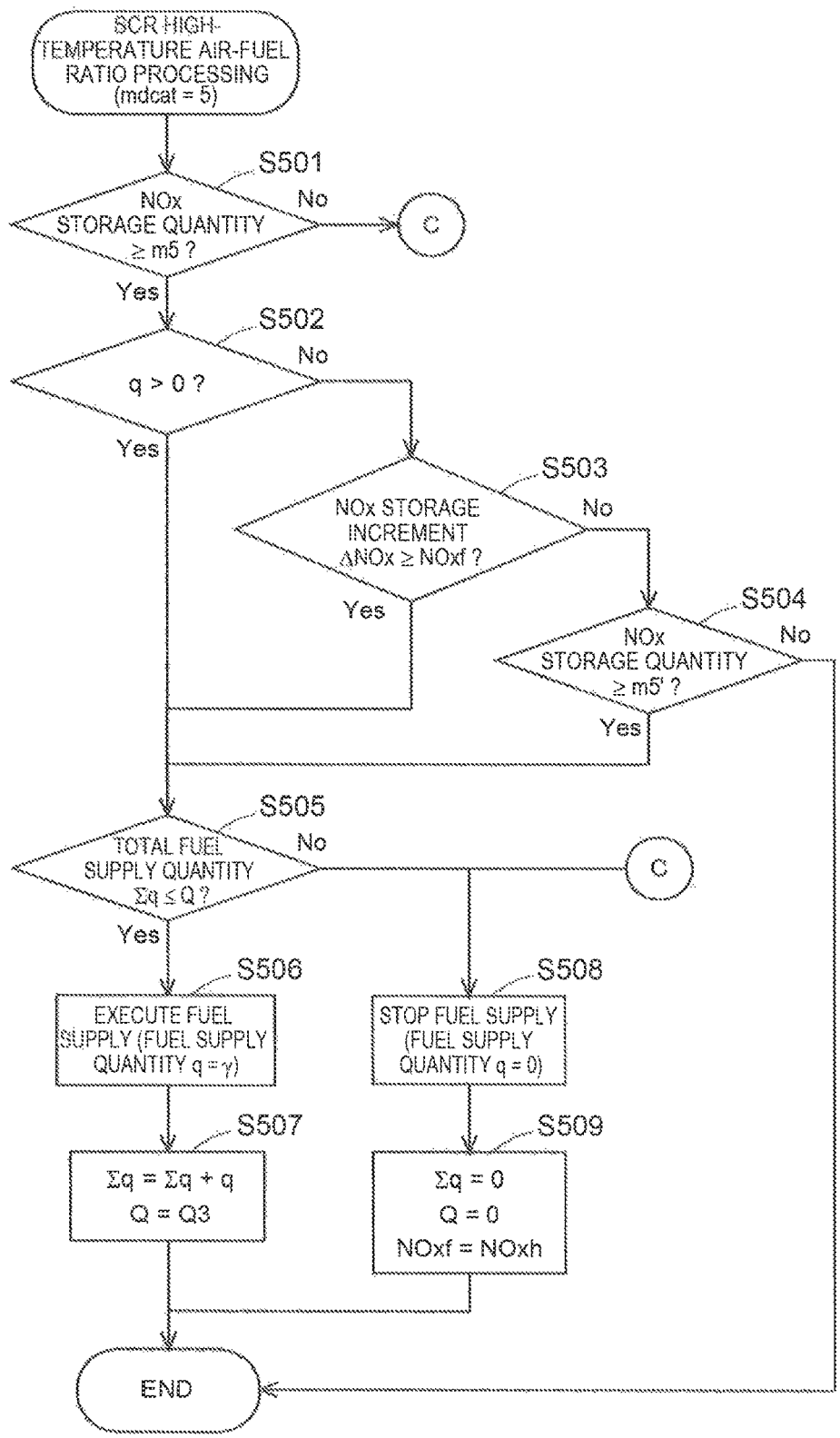
FIG. 9 is a flowchart of SCR high-temperature air-fuel ratio processing performed in the exhaust gas control system for an internal combustion engine illustrated in FIG. 1.
Figure 10:
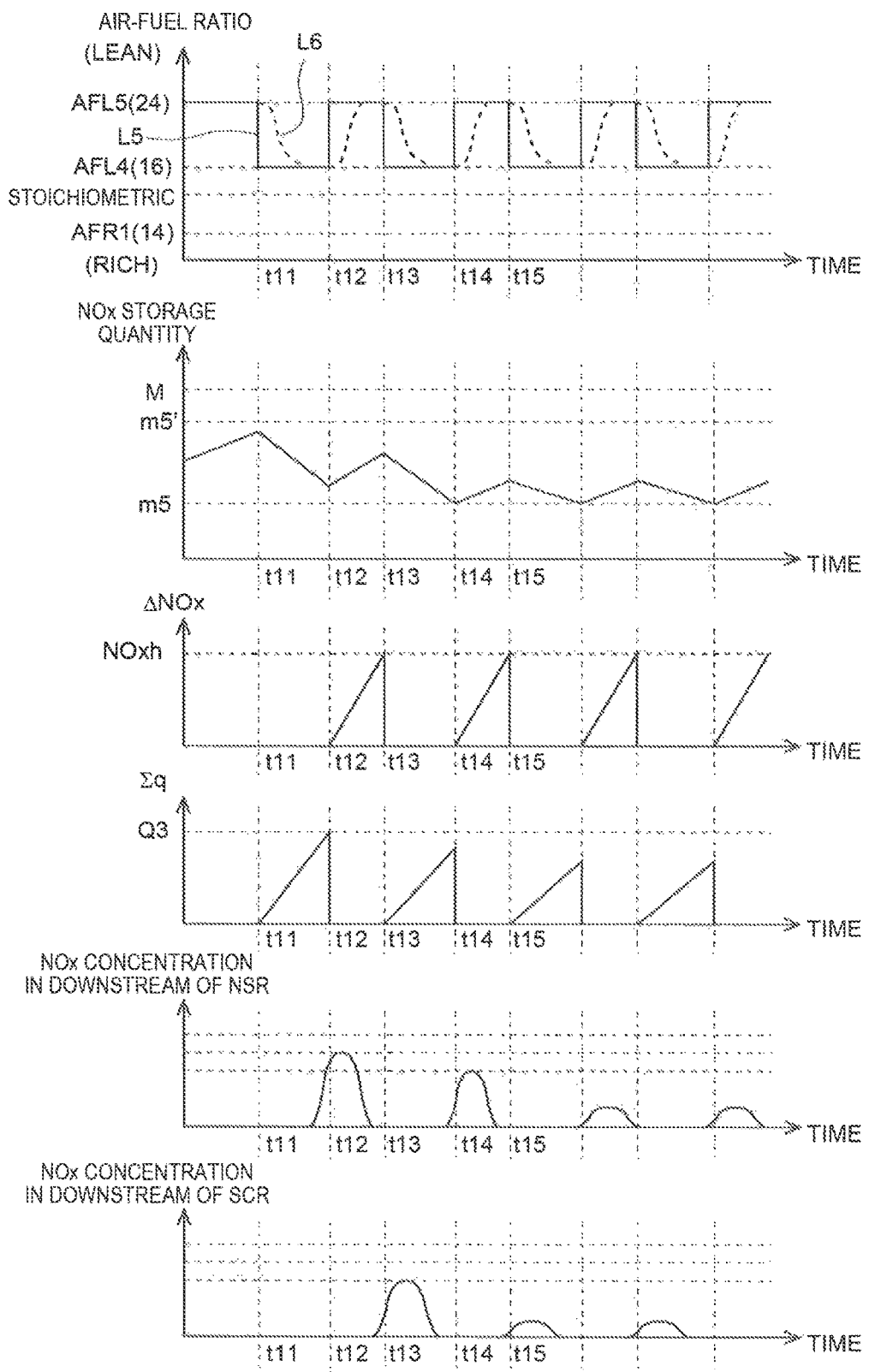
FIG. 10 illustrates transition of parameters relating to NOx reduction when the SCR high-temperature air-fuel ratio processing illustrated in FIG. 9 is executed.

A second embodiment regarding the air-fuel ratio processing of the exhaust gas flowing into the NSR catalyst executed in the exhaust gas control system of the internal combustion engine 1 will be described with reference to FIGS. 8 to 10. FIG. 8 is a flowchart of the NSR-side setting processing regarding the air-fuel ratio processing according to the second embodiment. FIG. 9 is a flowchart of SCR high-temperature air-fuel ratio processing as the air-fuel ratio processing according to the second embodiment, which is different from the air-fuel ratio processing using both the catalysts. The SCR high-temperature air-fuel ratio processing is one example of the high-temperature air-fuel ratio processing. FIG. 10 illustrates transition of parameters relating to NOx reduction when the SCR high-temperature air-fuel ratio processing illustrated in FIG. 9 is executed. The SCR high-temperature air-fuel ratio processing is also repeatedly executed at predetermined intervals based on a control program stored in the ECU 20, the SCR high-temperature air-fuel ratio processing being executed independently of the NSR-side setting processing and the SCR-side setting processing.

First, the NSR-side setting processing according to the present embodiment will be described with reference to FIG. 8. Among each processing included in the NSR-side setting processing of the present embodiment, the processing substantially identical to that included in the NSR-side setting processing illustrated in FIG. 4 is designated by identical reference signs to omit the detailed description thereof. In the NSR-side setting processing of the present embodiment, when positive determination is made in S104, the processing proceeds to S401. In S401, it is determined whether or not the catalyst temperature of the SCR catalyst 5 is lower than a threshold temperature TS3 illustrated in FIG. 2B. When positive determination is made in S401, it signifies that the catalyst temperature of the SCR catalyst 5 belongs to the predetermined second temperature range but the NOx reducing performance is in a relatively low state. As a consequence, the processing proceeds to S105, where the parameter mdcat is set to "2." When negative determination is made in S401, it signifies that the catalyst temperature of the SCR catalyst 5 belongs to the predetermined second temperature range and the NOx reducing performance is in a relatively high state. As a consequence, the processing proceeds to S402, where the parameter mdcat is set to "5."

According to the NSR-side setting processing illustrated in FIG. 8 and the SCR-side setting processing illustrated in FIG. 4, the air-fuel ratio processing through fuel supply from the fuel supply valve 6 is executed for the NSR catalyst 3 in accordance with the set value of the parameter mdcat. The case where the parameter mdcat is set to "0", "1" or "2" is as described in the first embodiment.

Furthermore, when the parameter mdcat is set to "5", NOx reduction by the NSR catalyst 3 is not performed but NOx reduction by the SCR catalyst 5 is performed, based on the catalyst temperature of the SCR catalyst 5 belonging to the predetermined second temperature range and the NOx reducing performance being in a relatively high state as described in the foregoing. That is, when the parameter mdcat is set to "5", NOx reduction is performed mainly by the SCR catalyst 5. In order to perform NOx reduction by the NSR catalyst 3, it is necessary to adjust the air-fuel ratio of the exhaust gas flowing into the NSR catalyst 3 to be a predetermined rich air-fuel ratio that is richer than the stoichiometric air-fuel ratio. To take advantage of the NOx reducing performance of the SCR catalyst 5 in that case, it is necessary to control the valence of the copper ion in the SCR catalyst 5 such that NOx can be reduced as in the air-fuel ratio processing using both the catalysts described before. When the catalyst temperature of the SCR catalyst 5 is equal to or more than the threshold temperature TS3, the NOx reducing performance of the SCR catalyst 5 is sufficient. Accordingly, even when the catalyst temperature of the NSR catalyst 3 belongs to the predetermined first temperature range, NOx discharged from the internal combustion engine 1 can sufficiently be reduced and purified by only the SCR catalyst 5. Furthermore, stopping execution of NOx reduction by the NSR catalyst 3 makes it possible to suppress discharge of a fuel component to the outside of the system, the fuel component being generated by adjusting the air-fuel ratio of the exhaust gas to the predetermined rich air-fuel ratio.

However, when NOx reduction by the SCR catalyst 5 is performed, it is preferable that the air-fuel ratio of the exhaust gas flowing into the SCR catalyst 5 be a lean air-fuel ratio (air-fuel ratio leaner than the stoichiometric air-fuel ratio) where oxygen content is high enough to allow continuous recovery of the valence of the copper ion in the SCR catalyst 5. In that case, the NSR catalyst 3 disposed on the upstream side of the SCR catalyst 5 ends up storing the NOx in the exhaust gas up to an allowable limit. While the NSR catalyst 3 is in such a state, the temperature of the exhaust gas may rise due to the reasons such as increase in engine load of the internal combustion engine 1. In such a case, the stored NOx may possibly be emitted from the NSR catalyst 3 at a speed rapid enough to hinder reduction treatment in the SCR catalyst 5.

Accordingly, to cope with such an issue, the SCR high-temperature air-fuel ratio processing illustrated in FIG. 9 is executed when the parameter mdcat is set to "5." FIG. 10 illustrates transition of various parameters relating to NOx reduction when the SCR high-temperature air-fuel ratio processing is executed. Specifically, FIG. 10 illustrates transition of each parameter including the air-fuel ratio of the exhaust gas flowing into the NSR catalyst 3 (transition illustrated with a solid line L5), the air-fuel ratio of the exhaust gas flowing out of the NSR catalyst 3 (transition illustrated with a broken line L6), the NOx storage quantity in the NSR catalyst 3, the NOx storage increment ΔNOx, the total fuel supply quantity Σq, the NOx concentration in the downstream of the NSR catalyst 3, the NOx concentration in the downstream of the SCR catalyst 5. Definition of the respective parameters in the present embodiment is similar to the definition of the respective parameters in the first embodiment.

First, in S501, it is determined whether or not the NOx storage quantity in the NSR catalyst 3 is equal to or more than a lower limit threshold value m5 that is a lower limit of the NOx storage quantity required to prevent the fuel that is supplied from the fuel supply valve 6 from flowing out to the downstream side without being used for NOx reduction reaction in the NSR catalyst 3 when the later-described fourth air-fuel ratio processing in S506 is executed. When positive determination is made in S501, the processing proceeds to S502. When negative determination is made, the processing proceeds to S508.

Next, in S502, it is determined whether or not the fuel supply quantity q per unit time is larger than zero, that is, whether or not fuel supply is performed from the fuel supply valve 6. When positive determination is made in S502, the processing proceeds to S505. When negative determination is made, the processing proceeds to S503. In S503, it is determined whether or not the NOx storage increment ΔNOx is equal to or more than a set value of NOxf. When positive determination is made in S503, the processing proceeds to S505. When negative determination is made, the processing proceeds to S504. In S504, it is determined whether or not the NOx storage quantity in the NSR catalyst 3 is equal to or more than an upper limit threshold value m5' that is a substantial upper limit of the NOx storage quantity when the SCR high-temperature air-fuel ratio processing is executed. When positive determination is made in S504, the processing proceeds to S505. When negative determination is made, the SCR high-temperature air-fuel ratio processing is ended.

Next, in S505, it is determined whether or not the total fuel supply quantity Σq is equal to or less than a set value of the parameter Q. Here, in the SCR high-temperature air-fuel ratio processing, the value set as the parameter Q is one of Q3 set in S507 described later and "0" set in S509 described later. The set values are used to determine whether or not an assumed quantity of the stored NOx is emitted from the NSR catalyst 3 with respect to the total fuel supply quantity Σq from the fuel supply valve 6. The detail thereof will be described later. When positive determination is made in S505, the processing proceeds to S506. When negative determination is made, the processing proceeds to S508.

In S506, fuel supply from the fuel supply valve 6 is executed, and the fuel supply quantity q per unit time is set to γ. The fuel supply in S506 causes the air-fuel ratio of the exhaust gas flowing into the NSR catalyst 3 to be a fourth lean air-fuel ratio AFL4. The fourth lean air-fuel ratio AFL4 is an air-fuel ratio leaner than the stoichiometric air fuel ratio, the fourth lean air-fuel ratio AFL4 enabling the NSR catalyst 3 to emit stored NOx. For example, the fourth lean air-fuel ratio is about 16. Therefore, the processing of S506 for forming the exhaust gas having the fourth lean air-fuel ratio AFL4 is one example of the fourth air-fuel ratio processing of the present disclosure. Then, in S507 after the processing of S506, the quantity of fuel supplied in S506 is integrated, so that the total fuel supply quantity Σq is updated, and the parameter Q is set to Q3. The value Q3 is the total supply quantity of fuel corresponding to the storage quantity of NOx emitted from the NSR catalyst 3 in the fourth air-fuel ratio processing. After the processing of S507, the SCR high-temperature air-fuel ratio processing is ended.

When the processing proceeds to S508 after negative determination is made in S505 or after negative determination is made in S501, fuel supply from the fuel supply valve 6 is stopped in S508. Therefore, the fuel supply quantity q per unit time in this case becomes "0." Since the fuel supply is stopped in S508, the air-fuel ratio of the exhaust gas flowing into the NSR catalyst 3 is adjusted to be a fifth lean air-fuel ratio AFL5 that is an air-fuel ratio leaner than the fourth lean air-fuel ratio AFL4 formed in S506. Therefore, the processing of S508 for forming the exhaust gas having the fifth lean air-fuel ratio AFL5 is one example of the fifth air-fuel ratio processing of the present disclosure. The fifth lean air-fuel ratio AFL5 is about 24, for example. Then, in S509 after the processing of S508, the total fuel supply quantity Σq is set to "0", the parameter Q is set to "0", and the parameter NOxf is set to NOxh. The value NOxh is a target value of the NOx storage quantity which increases in the NSR catalyst 3, while the fifth air-fuel ratio processing is performed in S508. The value NOxh is a set value for at least securing the duration required for valence recovery of the copper ion in the SCR catalyst 5 in the fifth air-fuel ratio processing.

The NOx storage increment ΔNOx, the total fuel supply quantity Σq, the fuel supply quantity q, and the parameter Q are reset when the value of the parameter mdcat is changed by the NSR-side setting processing. Specifically, the NOx storage increment ΔNOx is reset to "0", the total fuel supply quantity Σq is reset to "0", the fuel supply quantity q per unit time is reset to "0", and the parameter Q is reset to "0," Furthermore, the parameters are also reset when the internal combustion engine 1 is started upon the ignition being turned on.

Here, the flow of the SCR high-temperature air-fuel ratio processing illustrated in FIG. 9 is described based on transition of the parameters relating to NOx reduction illustrated in FIG. 10. FIG. 10 illustrates typical time t11 to t15 when the SCR high-temperature air-filet ratio processing is executed. Hereinafter, the flow of the SCR high-temperature air-fuel ratio processing is described along the passage of time.

First, in a period to time t11, the parameter mdcat is set to "0" by the NSR-side setting processing. Accordingly, since the exhaust gas discharged from the internal combustion engine 1 directly flows into the NSR catalyst 3, the air-fuel ratio of the exhaust gas becomes similar to the air-fuel ratio AFL5 (having a value of about 24) that is leaner than the stoichiometric air fuel ratio. The NOx storage quantity in the NSR catalyst 3 increases with the passage of time (a value M illustrated in the transition of the NOx storage quantity in FIG. 10 is a threshold value used as a trigger to adjust the air-fuel ratio of the exhaust gas to be a predetermined rich air-fuel ratio, when mdcat is set to "1"). At this time, it is assumed that the catalyst temperature of the SCR catalyst 5 belongs to the predetermined second temperature range, the urea water addition request is set to ON in the SCR-side setting processing, and urea water addition from the addition valve 7 is performed. Thus, since the SCR high-temperature air-fuel ratio processing is not executed in the period to time t11, the NOx storage increment ΔNOx and the total fuel supply quantity Σq are "0," Since the NSR catalyst 3 stored NOx in the exhaust gas in such circumstances, the NOx concentration on the downstream side of the NSR catalyst 3 is low. Since NOx reduction is performed in the SCR catalyst 5 with the urea water added from the addition valve 7 and with ammonia as a reducing agent, the NOx concentration on the downstream side of the SCR catalyst 5 is also low.

When the parameter mdcat is set to "5" in the NSR-side setting processing at time t11, the SCR high-temperature air-fuel ratio processing is started. At the start time, the NOx storage quantity in the NSR catalyst 3 is equal to or more than m5. Consequently, in S501, positive determination is made. Since fuel supply from the fuel supply valve 6 is not yet started, negative determination is made in S502. However, in S503, positive determination is made since the NOx storage increment ΔNOx is "0" and the parameter NOxf is also "0". Furthermore, in S505, since the total fuel supply quantity Σq is "0" and the parameter Q is "0" either, positive determination is made. As a result, at time t11, the fourth air-fuel ratio processing is started in S506. At this time, the air-fuel ratio of the exhaust gas flowing into the NSR catalyst 3 becomes the fourth lean air-fuel ratio AFL4. Then, in S507, the fuel supply quantity q from the fuel supply valve 6 is integrated, and the parameter Q is set to Q3. As described before, the value Q3 is the total fuel quantity corresponding to the quantity of the stored NOx assumed to be emitted from the NSR catalyst 3 in the fourth air-fuel ratio processing. That is, the value Q3 is the total quantity of fuel required to emit an assumed quantity of stored NOx in the range where the quantity of NOx flowing out from the exhaust gas control system can be suppressed during the fourth air-fuel ratio processing.

When the processing of S507 is ended, the SCR high-temperature air-fuel ratio processing is repeated again from S501. Accordingly, after the fourth air-fuel ratio processing is started at time t11, positive determination is made in S501, and then positive determination is made in S502 before the processing reaches S505. Although the total fuel supply quantity Σq is increased by the fourth air-fuel ratio processing, it does not yet reach Q3 set in S507. Accordingly, in S505, positive determination is made, and processing of S506 and S507 is performed in sequence.

As described in the foregoing, in a period after time t11 and before time t12 described later, the fourth air-fuel ratio processing continues. Consequently, the NOx stored in the NSR catalyst 3 is emitted and thereby the NOx storage quantity is reduced. Since the emitted NOx has the fourth lean air-fuel ratio that is leaner than the stoichiometric air-fuel ratio, the NOx is not reduced in the NSR catalyst 3, but flows into the SCR catalyst 5. When the air-fuel ratio of the exhaust gas flowing into the NSR catalyst 3 is adjusted to be the fourth lean air-fuel ratio, the air-fuel ratio of the exhaust gas flowing out of the NSR catalyst 3 (i.e., the air-fuel ratio of the exhaust vas flowing into the SCR catalyst 5) does not immediately approximate the fourth lean air-fuel ratio (see the transition of the broken line L6). Since the catalyst temperature of the SCR catalyst 5 is also the threshold temperature TS3 or more, the NOx reducing performance is maintained high. At this time, in the SCR catalyst 5, the air-fuel ratio of the exhaust gas that allows continuous reduction NOx is maintained. Therefore, the NOx emitted from the NSR catalyst 3 is adequately reduced by the SCR catalyst 5.

When the fourth air-fuel ratio processing continues to some extent, the air-fuel ratio of the exhaust gas flowing into the SCR catalyst 5 also becomes the fourth lean air-fuel ratio AFL4. Although the fourth lean air-fuel ratio AFL4 is an air-fuel ratio leaner than the stoichiometric air fuel ratio, it is still the air-fuel ratio formed by fuel supply from the fuel supply valve 6 performed in the fourth air-fuel ratio processing. Therefore, the fourth air-fuel ratio hinders smooth valence recovery of the copper ion in the SCR catalyst 5, which results in deterioration in the NOx reducing performance of the SCR catalyst 5. Accordingly, in the present embodiment, negative determination is made in S505, so that the fourth air-fuel ratio processing is terminated when the total fuel supply quantity Σq exceeds Q3 set in S507. In FIG. 10, the time when negative determination is made because the total fuel supply quantity Σq exceeds Q3 in S505 is time t12.

Alternatively, coming of time t12 may be determined when the air-fuel ratio of the exhaust gas flowing out of the NSR catalyst 3 detected by the air fuel ratio sensor 10 becomes the fourth lean air-fuel ratio AFL4, and thereby the NOx reducing performance of the SCR catalyst 5 is deteriorated. Further alternatively, coming of time t12 may be determined when the NOx reducing rate by the SCR catalyst 5 calculated by the NOx sensors 11, 13 becomes less than a reference reducing rate, and thereby the NOx reducing performance of the SCR catalyst 5 is deteriorated. Still alternatively, coming of time t12 may be determined when the detection value of the NOx sensor 13 exceeds a reference NOx concentration relating to NOx outflow from the SCR catalyst 5 attributed to deterioration in the NOx reduction efficiency in the SCR catalyst 5, and thereby the NOx reducing performance of the SCR catalyst 5 is deteriorated.

Accordingly, as a result of negative determination made in S505, the fifth air-fuel ratio processing is started in S508 at time t12. At this time, the air-fuel ratio of the exhaust gas flowing into the NSR catalyst 3 becomes the fifth lean air-fuel ratio AFL5. Then, in S509, the total fuel supply quantity Σq is reset to "0", and the parameter Q is also reset to "0."

When the processing of S509 is ended, the SCR high-temperature air-fuel ratio processing is repeated again from S501. Accordingly, after time t12 when the fifth air-fuel ratio processing is started, the NOx storage quantity in the NSR catalyst 3 increases, and therefore positive determination is also made in S501. Then, negative determination is made in S502 since fuel supply from the fuel supply valve 6 is stopped. Then, in S503, it is determined whether or not the NOx storage increment ΔNOx from time t12 that is the latest fuel supply stop time is equal to or more than NOxh. Therefore, when the period in which the fifth air-fuel ratio processing continues after time t12 is short, the NOx storage increment ΔNOx does not reach NOxh. In this case, the processing proceeds to S504. In S504, determination is made based on the NOx storage quantity in the NSR catalyst 3. With such a configuration, in the case where the NOx storage increment ΔNOx does not yet reach NOxh and the NOx storage quantity is smaller than the upper limit threshold value m5', the SCR high-temperature air-fuel ratio processing is ended once and is restarted. That is, the fifth air-fuel ratio processing continues.

When the duration of the fifth air-fuel ratio processing is prolonged to some extent, and the NOx storage increment ΔNOx reaches NOxh (positive determination in S503) or the NOx storage quantity becomes more than an upper limit threshold value m5' (positive determination in S504), processing subsequent to S505 is performed and the fifth air-fuel ratio processing is stopped. More specifically, in the present embodiment, the duration of the fifth air-fuel ratio processing is the time until the increment of the NOx storage quantity in the NSR catalyst 3 reaches the predetermined quantity (NOxh) due to the fifth air-fuel ratio processing, or the time until the NOx storage quantity itself reaches the quantity (m5') set to prevent excessive increase of the NOx storage quantity. Alternatively, when the air-fuel ratio of the exhaust gas flowing out of the NSR catalyst 3 detected by the air fuel ratio sensor 10 upon execution of the fifth air-fuel ratio processing becomes the fifth lean air-fuel ratio AFL5, the fifth air-fuel ratio processing may be stopped, and the processing subsequent to S505 may be performed. Then, when the processing proceeds to S505, the total fuel supply quantity Σq and the parameter Q are "0", and therefore positive determination is made in S505. As a result, the processing proceeds to S506, so that the fifth air-fuel ratio processing is ended. Then, the fourth air-fuel ratio processing is started for the second time, and the time when the processing is started is time t13. In FIG. 10, time t13 comes when the NOx storage increment ΔNOx reaches NOxh.

Once the fourth air-fuel ratio processing is started for the second time in S506 at time t13, then in S507, the fuel supply quantity q from the fuel supply valve 6 is integrated (the total fuel supply quantity Σq in this case is the total quantity on the basis of the start time of the fourth air-fuel ratio processing for the second time). At the same time, the parameter Q is set to Q3, and the SCR high-temperature air-fuel ratio processing is again repeated from S501. The subsequent flow of the fourth air-fuel ratio processing for the second time is different from that of the first air-fuel ratio processing for the first time described before. Since it is determined that the NOx storage quantity in the NSR catalyst 3 becomes less than the lower limit threshold value m5 in S501 (negative determination in S501) before the total fuel supply quantity exceeds Q3 set in S507, the processing proceeds to S508 at the time when negative determination is made in S501 (time t14), and the fifth air-fuel ratio processing is started for the second time.

When the second air-fuel ratio processing for the second time is started in S508 at time t14, then in S509, the total fuel supply quantity Σq is reset to "0" and the parameter Q is also reset to "0." The parameter NOxf is set to NOxh. Then, the SCR high-temperature air-fuel ratio processing is repeated again from S501. The subsequent flow of the fifth air-fuel ratio processing for the second time continues until the NOx storage increment ΔNOx reaches NOxh (positive determination in S503) or the NOx storage quantity becomes the upper limit threshold value or more (positive determination in S504) as in the case of the aforementioned fifth air-fuel ratio processing for the first time. Then, in S505, positive determination is made and the processing proceeds to S506 since the total fuel supply quantity Σq and the parameter Q are "0." As a consequence, the fourth air-fuel ratio processing is started for the third time, and the time when the fourth air-fuel ratio processing is started is time t15.

After time t15, the fourth air-fuel ratio processing and the fifth air-fuel ratio processing are alternately repeated as described before as long as the parameter mdcat is set to a value "5" in the NSR-side setting processing.

Thus, in the exhaust gas control system for the internal combustion engine 1 of the present embodiment, when NOx reduction is performed using the NSR catalyst 3 and the SCR catalyst 5, the air-fuel ratio processing using both the catalysts illustrated in the first embodiment is executed if the catalyst temperature of the SCR catalyst 5 is in a relatively low state. Accordingly, as described in the foregoing, the NOx storage quantity in the NSR catalyst 3 is decreased by repetition of the first air-fuel ratio processing and the second air-fuel ratio processing, so that the SCR catalyst 5 can perform adequate reduction treatment of NOx flowing out at the time of the third air-fuel ratio processing. As a consequence, discharge of the NOx to the outside of the system can be suppressed. When the catalyst temperature of the SCR catalyst 5 is in a relatively high temperature state, the SCR high-temperature air-fuel ratio processing illustrated in the present embodiment is executed. When the SCR high-temperature air-fuel ratio processing is executed, the fourth air-fuel ratio processing and the fifth air-fuel ratio processing are repeatedly executed in an alternate manner. Accordingly, the NOx storage quantity in the NSR catalyst t is decreased, and the NOx emitted in the processing is reduced by the SCR catalyst 5, while valence recovery of the copper ion in the SCR catalyst 5 is achieved. As a result, continuous reduction treatment of the emitted NOx is adequately performed by the SCR catalyst 5, which suppresses discharge of NOx to the outside of the system. As a result, while the SCR catalyst 5-based NOx reduction is performed, the NOx storage quantity in the NSR catalyst 3 can be maintained to be a relatively small quantity that is hardly influenced by such factors as increase in load of the internal combustion engine.

Therefore, in order to suppress discharge of NOx from the exhaust gas control system to the outside as much as possible, the fuel supply quantity γ from the fuel supply valve 6 per unit time at the time of the fourth air-fuel ratio processing is preferably the fuel supply quantity that is an emission quantity of NOx reducible in the SCR catalyst 5 on the downstream side.

In the fifth air-fuel ratio processing, the fifth lean air-fuel ratio AFL5 is formed by stopping the fuel supply from the fuel supply valve 6 in S508. In place of this mode, in S508, the fuel supply quantity from the fuel supply valve 6 may be adjusted to be the quantity smaller than the value in the range where the valence of the copper ion in the SCR catalyst 5 can be recovered. As a result, the air-fuel ratio of the exhaust gas flowing into the SCR catalyst 5 is made to be leaner than the fourth lean air-fuel ratio AFL4.

What is claimed is:

1. An exhaust gas control system for an internal combustion engine, the exhaust gas control system comprising:
    a NOx storage reduction catalyst provided in an exhaust passage of the internal combustion engine;
    a fuel supply valve configured to supply fuel to exhaust gas flowing into the NOx storage reduction catalyst so as to adjust an air-fuel ratio of the exhaust gas flowing into the NOx storage reduction catalyst;
    a selective catalytic reduction catalyst provided on a downstream side of the NOx storage reduction catalyst in the exhaust passage, the selective catalytic reduction catalyst being configured to selectively reduce NOx with ammonia as a reducing agent;
    an addition device configured to add one of ammonia and a precursor of ammonia as an additive to the exhaust gas flowing into the selective catalytic reduction catalyst; and
    an electronic control unit configured to control the exhaust gas control system,
    when the electronic control unit determines that a temperature of the NOx storage reduction catalyst is a temperature within a predetermined first temperature range and a temperature of the selective catalytic reduction catalyst is a temperature within a predetermined second temperature range, the electronic control unit being configured to add the additive with the addition device, and execute a predetermined air-fuel ratio processing that controls the air-fuel ratio of the exhaust gas flowing into the NOx storage reduction catalyst with the fuel supply valve,
    the predetermined first temperature range being a temperature range in which the NOx storage reduction catalyst reduces NOx,
    the predetermined second temperature range being a temperature range in which the selective catalytic reduction catalyst reduces NOx,
    the predetermined air-fuel ratio processing including a first air-fuel ratio processing, a second air-fuel ratio processing, and a third air-fuel ratio processing,
    the first air-fuel ratio processing being processing in which the electronic control unit executes fuel supply with the fuel supply valve so as to adjust the air-fuel ratio of the exhaust gas flowing into the NOx storage reduction catalyst to be a first lean air-fuel ratio, the first lean air-fuel ratio being an air-fuel ratio leaner than a stoichiometric air-fuel ratio, the first lean air-fuel ratio causing emission of stored NOx from the NOx storage reduction catalyst,
    the second air-fuel ratio processing being processing in which the electronic control unit regulates fuel supply with the fuel supply valve so as to adjust the air-fuel ratio of the exhaust gas flowing into the NOx storage reduction catalyst to be a second lean air-fuel ratio, the second lean air-fuel ratio being an air-fuel ratio leaner than the first lean air-fuel ratio,
    the third air-fuel ratio processing being processing in which the electronic control unit executes fuel supply with the fuel supply valve so as to reduce NOx stored in the NOx storage reduction catalyst and adjust the air-fuel ratio of the exhaust gas flowing into the NOx storage reduction catalyst to be a predetermined rich air-fuel ratio, the predetermined rich air-fuel ratio being an air-fuel ratio richer than the stoichiometric air-fuel ratio,
    in the predetermined air-fuel ratio processing, the electronic control unit being configured to execute the second air-fuel ratio processing after the first air-fuel ratio processing, and execute the third air-fuel ratio processing after the first air-fuel ratio processing and the second air-fuel ratio processing; and the third air-fuel ratio processing being in succession to the second air-fuel ratio processing.

2. The exhaust gas control system according to claim 1, wherein
    the electronic control unit is configured to repeatedly execute the first air-fuel ratio processing and the second air-fuel ratio processing in an alternate manner in the predetermined air-fuel ratio processing, and
    the electronic control unit is configured to execute the third air-fuel ratio processing in succession to the second air-fuel ratio processing executed lastly, when the electronic control unit executes the first air-fuel ratio processing and the second air-fuel ratio processing repeatedly in the alternate manner.

3. The exhaust gas control system according to claim 1, wherein
when the electronic control unit determines that the temperature of the NOx storage reduction catalyst is the temperature within the predetermined first temperature range, and the temperature of the selective catalytic reduction catalyst is the temperature within a temperature range lower than a threshold temperature in the predetermined second temperature range, the electronic control unit is configured to add the additive with the addition device and execute the predetermined air-fuel ratio processing with the fuel supply valve,
when the electronic control unit determines that the temperature of the NOx storage reduction catalyst is the temperature within the predetermined first temperature range, and the temperature of the selective catalytic reduction catalyst is the temperature within a temperature range equal to or more than the threshold temperature in the predetermined second temperature range, the electronic control unit is configured to add the additive with the addition device and execute high-temperature air-fuel ratio processing relating to the air-fuel ratio of the exhaust gas flowing into the NOx storage reduction catalyst with the fuel supply valve, the high-temperature air-fuel ratio processing being different from the predetermined air-fuel ratio processing,
the high-temperature air-fuel ratio processing includes fourth air-fuel ratio processing and fifth air-fuel ratio processing,
the fourth air-fuel ratio processing being processing in which the electronic control unit executes fuel supply with the fuel supply valve so as to adjust the air-fuel ratio of the exhaust gas flowing into the NOx storage reduction catalyst to be a fourth lean air-fuel ratio, the fourth lean air-fuel ratio being an air-fuel ratio leaner than the stoichiometric air-fuel ratio, the fourth lean air-fuel ratio causing emission of stored NOx from the NOx storage reduction catalyst,
the fifth air-fuel ratio processing is processing in which the electronic control unit regulates fuel supply with the fuel supply valve so as to adjust the air-fuel ratio of the exhaust gas flowing into the NOx storage reduction catalyst to be a fifth lean air-fuel ratio, the fifth lean air-fuel ratio being an air-fuel ratio leaner than the fourth lean air-fuel ratio, and
the electronic control unit is configured to repeatedly execute the fourth air-fuel ratio processing and the fifth air-fuel ratio processing in an alternate manner in the high-temperature air-fuel ratio processing.

4. The exhaust gas control system according to claim 1, wherein
the electronic control unit is configured to stop fuel supply with the fuel supply valve in the second air-fuel ratio processing so as to adjust the air-fuel ratio of the exhaust gas flowing into the NOx storage reduction catalyst to be the second lean air-fuel ratio.

5. The exhaust gas control system according to claim 4, wherein
when the electronic control unit determines that the air-fuel ratio of the exhaust gas flowing out of the NOx storage reduction catalyst becomes one of the second lean air-fuel ratio and an air-fuel ratio in a vicinity of the second lean air-fuel ratio in the second air-fuel ratio processing, the electronic control unit is configured to stop the second air-fuel ratio processing.

6. The exhaust gas control system according to claim 3, wherein
the electronic control unit is configured to stop fuel supply with the fuel supply valve in the fifth air-fuel ratio processing so as to adjust die air-fuel ratio of the exhaust gas flowing into the NOx storage reduction catalyst to be the fifth lean air-fuel ratio.

7. The exhaust gas control system according to claim 1, wherein
in the predetermined air-fuel ratio processing, when the electronic control unit determines that an NOx reducing rate by the selective catalytic reduction catalyst becomes less than a predetermined reducing rate threshold value during the first air-fuel ratio processing, the electronic control unit is configured to switch the first air-fuel ratio processing to the second air-fuel ratio processing, and continue the second air-fuel ratio processing for a predetermined period.

8. A control method for an exhaust gas control system,
the exhaust gas control system being provided with an internal combustion engine, the exhaust gas control system including an NOx storage reduction catalyst, a fuel supply valve, a selective catalytic reduction catalyst, an addition device, and an electronic control unit,
the NOx storage reduction catalyst being provided in an exhaust passage of the internal combustion engine,
the fuel supply valve being configured to supply fuel to exhaust gas flowing into the NOx storage reduction catalyst so as to adjust an air-fuel ratio of the exhaust gas flowing into the NOx storage reduction catalyst,
the selective catalytic reduction catalyst being provided on a downstream side of the NOx storage reduction catalyst in the exhaust passage, the selective catalytic reduction catalyst being configured to selectively reduce NOx with ammonia as a reducing agent,
the addition device being configured to add one of ammonia and a precursor of ammonia as an additive to the exhaust gas flowing into the selective catalytic reduction catalyst,
the control method comprising:
when the electronic control unit determines that a temperature of the NOx storage reduction catalyst is a temperature within a predetermined first temperature range and a temperature of the selective catalytic reduction catalyst is a temperature within a predetermined second temperature range, adding the additive with the addition device, and executing, by the electronic control unit, a predetermined air-fuel ratio processing that controls the air-fuel ratio of the exhaust gas flowing into the NOx storage reduction catalyst with the fuel supply valve,
the predetermined first temperature range being a temperature range in which the NOx storage reduction catalyst reduces NOx,
the predetermined second temperature range being a temperature range in which the selective catalytic reduction catalyst reduces NOx,
the predetermined air-fuel ratio processing including a first air-fuel ratio processing, a second air-fuel ratio processing, and a third air-fuel ratio processing, the first air-fuel ratio processing being processing in which the electronic control unit executes fuel supply with the fuel supply valve so as to adjust the air-fuel ratio of the exhaust gas flowing into the NOx storage reduction catalyst to be a first lean air-fuel ratio, the first lean air-fuel ratio being an air-fuel ratio leaner than a stoichiometric air-fuel ratio, the first lean air-fuel ratio causing emission of stored NOx from the NOx storage reduction catalyst, the second air-fuel ratio processing being processing in which the electronic control unit regulates fuel supply with the fuel supply valve so as to adjust the air-fuel ratio of the exhaust gas flowing into the NOx storage reduction catalyst to be a second lean air-fuel ratio, the second lean air-fuel ratio being an air-fuel ratio leaner than the first lean air-fuel ratio, the third air-fuel ratio processing being processing in which the electronic control unit executes fuel supply with the fuel supply valve so as to reduce NOx stored in the NOx storage reduction catalyst and adjust the air-fuel ratio of the exhaust gas flowing into the NOx storage reduction catalyst to be a predetermined rich air-fuel ratio, the predetermined rich air-fuel ratio being an air-fuel ratio richer than a stoichiometric air-fuel ratio; and in the predetermined air-fuel ratio processing, executing, by the electronic control unit, the second air-fuel ratio processing after the first air-fuel ratio processing, and executing, by the electronic control unit, the third air-fuel ratio processing after the first air-fuel ratio processing and the second air-fuel ratio processing; and the third air-fuel ratio processing being in succession to the second air-fuel ratio processing.

* * * * *